United States Patent [19]

Arney et al.

[11] Patent Number: 5,235,187
[45] Date of Patent: Aug. 10, 1993

[54] METHODS OF FABRICATING INTEGRATED, ALIGNED TUNNELING TIP PAIRS

[75] Inventors: Susanne C. Arney; Noel C. MacDonald; Jun J. Yao, all of Ithaca, N.Y.

[73] Assignee: Cornell Research Foundation, Ithaca, N.Y.

[21] Appl. No.: 868,138

[22] Filed: Apr. 14, 1992

Related U.S. Application Data

[63] Continuation-in-part of Ser. No. 699,390, May 14, 1991, abandoned.

[51] Int. Cl.⁵ ............................................. G21K 5/10
[52] U.S. Cl. .................................... 250/306; 250/307
[58] Field of Search ................ 250/306, 307; 156/625

[56] References Cited

U.S. PATENT DOCUMENTS

| | | | |
|---|---|---|---|
| 3,769,531 | 9/1973 | Elkuch | 310/6 |
| 3,835,338 | 1/1974 | Martin | 310/8.6 |
| 4,319,397 | 4/1982 | Tanabe et al. | 29/589 |
| 4,348,650 | 8/1982 | Minagawa et al. | 353/125 |
| 4,381,672 | 2/1983 | O'Connor et al. | 73/505 |
| 4,517,486 | 5/1985 | Andrews | 310/331 |
| 4,570,139 | 1/1986 | Kroll | 335/187 |
| 4,575,822 | 1/1986 | Quate | 365/174 |
| 4,668,865 | 1/1987 | Gimzewski et al. | 250/306 |
| 4,724,318 | 2/1988 | Binnig | 250/306 |
| 4,740,410 | 5/1988 | Muller et al. | 428/133 |
| 4,746,621 | 5/1988 | Thomas et al. | 437/24 |
| 4,806,755 | 2/1989 | Duerig et al. | 250/306 |
| 4,831,614 | 5/1989 | Duerig et al. | 250/306 |
| 4,906,840 | 3/1990 | Zdeblick et al. | 250/306 |
| 4,943,719 | 6/1990 | Akamine et al. | 250/306 |
| 4,981,552 | 2/1991 | Mikkor | 156/647 |
| 5,103,095 | 4/1992 | Elings et al. | 350/306 |

FOREIGN PATENT DOCUMENTS 63-136982  6/1988  Japan.

OTHER PUBLICATIONS

"The Tunneling Microscope: A New Look at the Atomic World", Golovchenko *Science* vol. 232, Apr. 4, 1986, pp. 48–54.

"New SOI CMOS Process with Selective Oxidation", Kubota et al, IEDM 86 1986 IEEE pp. 814–816.

"Vacuum Tunneling: A New Technique for Microscopy", Quate, *Physics Today* Aug. 1986, pp. 26–33.

"Scanning Tunneling Microscope for Atomic Resolution Surface Studies" STM 2000 *VG Microscopes* Oct. 1987 8 pages.

"Formation of Submicron Silicon–on–Insulator Structures by Lateral Oxidation of Substrate-Silicon Islands", Arney J. Vac. Sci. Technol. B 6 (1) Jan./Feb. 1988, pp. 341–352.

"Self-Aligned Silicon–Strip Field Emitter Array" J. P. Spallas, Inst. Phys. Conf. Ser. No. 99: Section 1; Paper presented at 2nd Int. Conf. on Vac. Microelectron, Bath 1989 (4 pages).

"Field Emitter Tips for Vacuum Microelectronic Devices" Chin, J. Vac. Sci. Technol. A, vol. 8, No. 4, Jul./Aug. 1990 pp. 3586–3590.

"Micromachined Silicon Tunnel Sensor for Motion Detection" Kenny, Appl. Phys. Lett 58 (1), Jan. 7, 1991 pp. 100–102.

*Primary Examiner*—Paul M. Dzierzynski
*Assistant Examiner*—Kiet T. Nguyen
*Attorney, Agent, or Firm*—Jones, Tullar & Cooper

[57] ABSTRACT

Self-aligned, opposed, nanometer dimension tips are fabricated in pairs, one of each pair being located on a movable, single crystal beam, with the beam being movable in three dimensions with respect to a substrate carrying the other tip of a pair. Motion of one tip with respect to the other is controlled or sensed by transducers formed on the supporting beams. Spring means in each beam allow axial motion of the beam. The tips and beams are fabricated from single crystal silicon substrate, and the tips may be electrically isolated from the substrate by fabricating insulating segments in the beam structure.

69 Claims, 15 Drawing Sheets

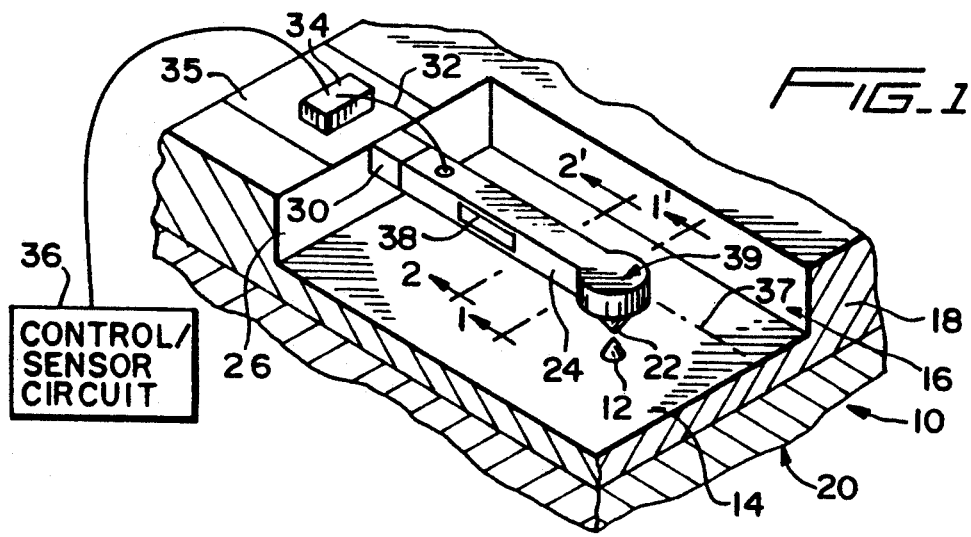
FIG_1
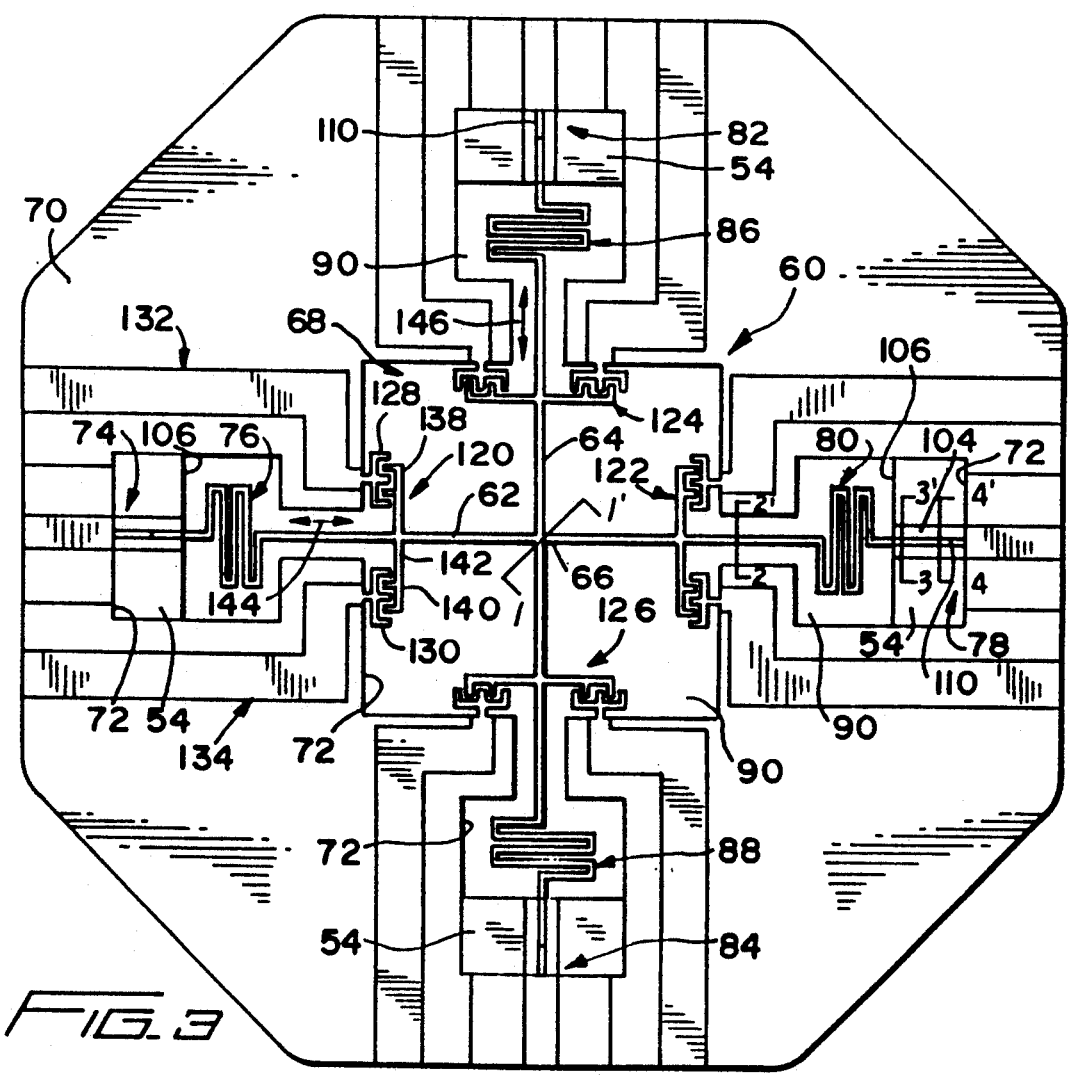
FIG_3

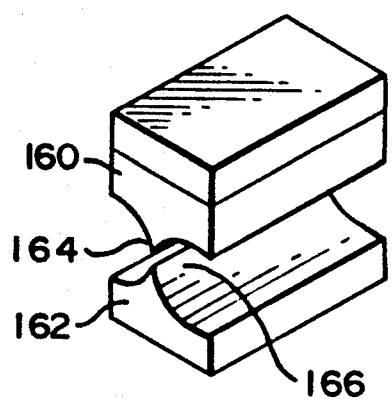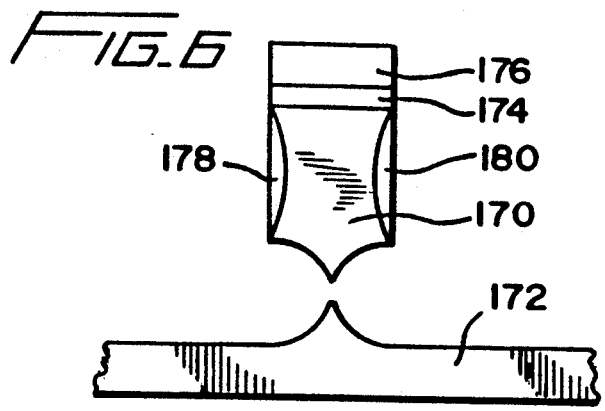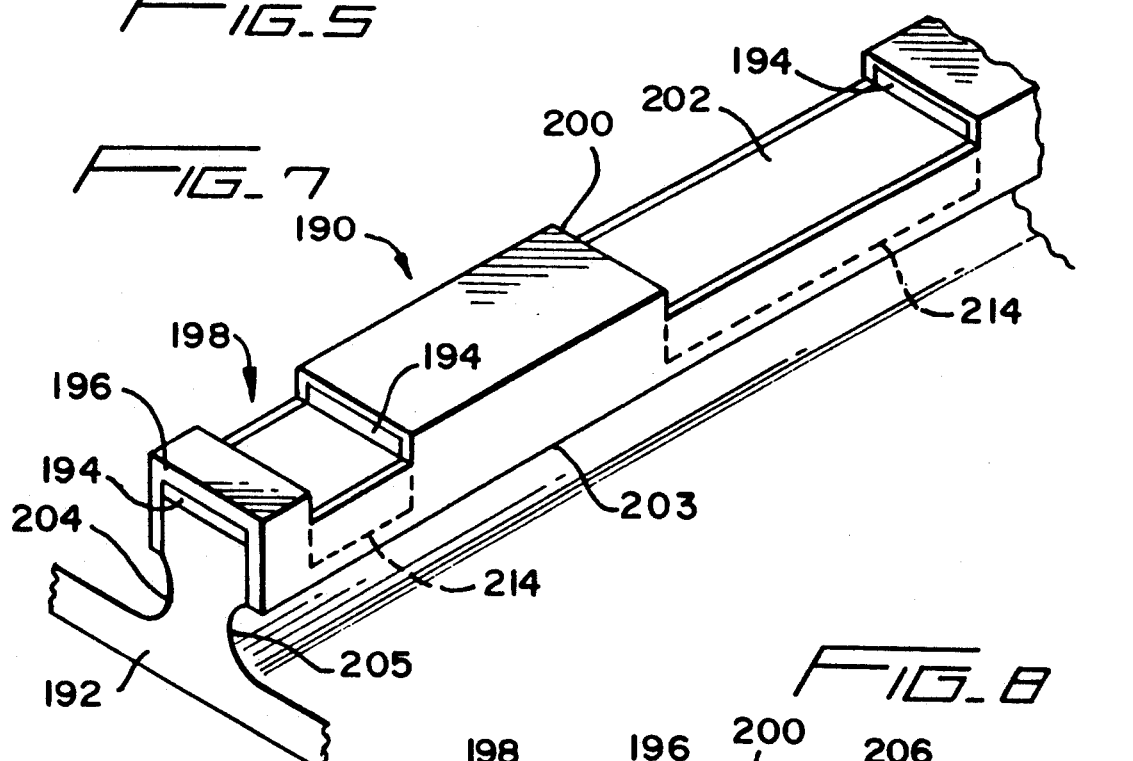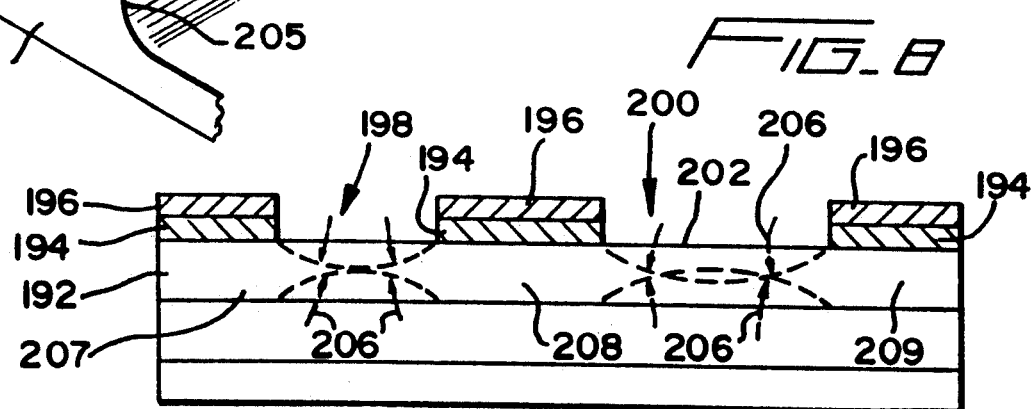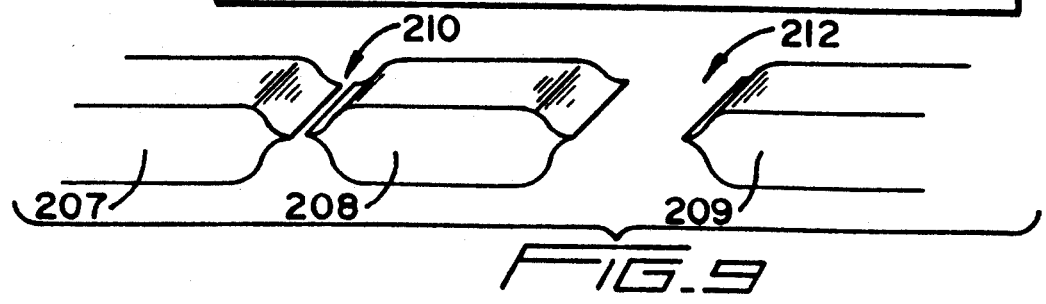

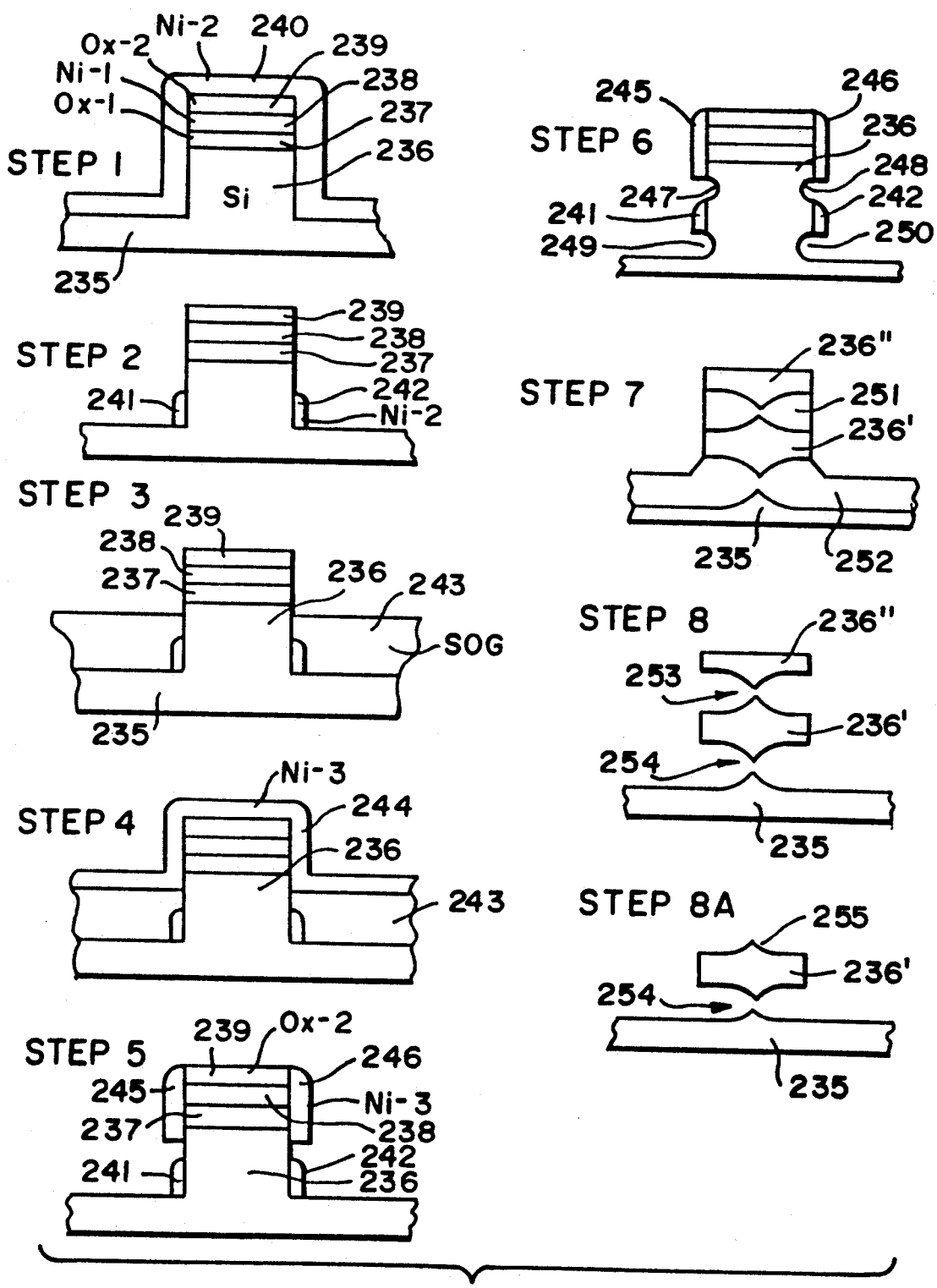
FIG_10

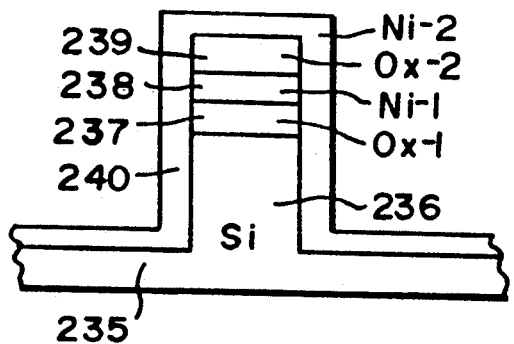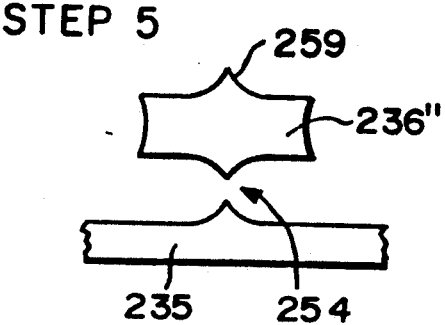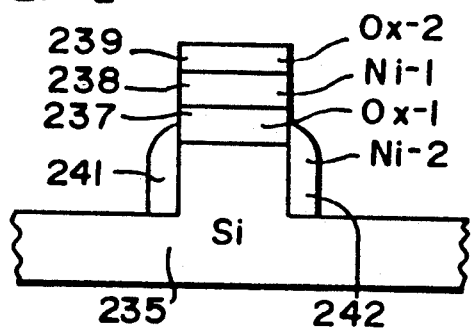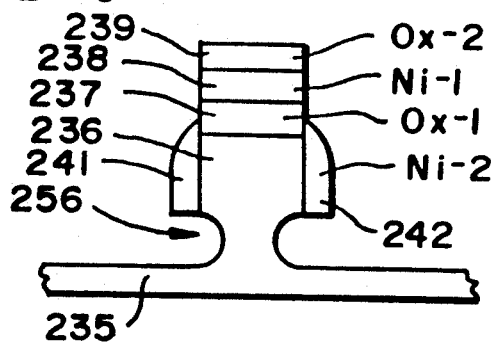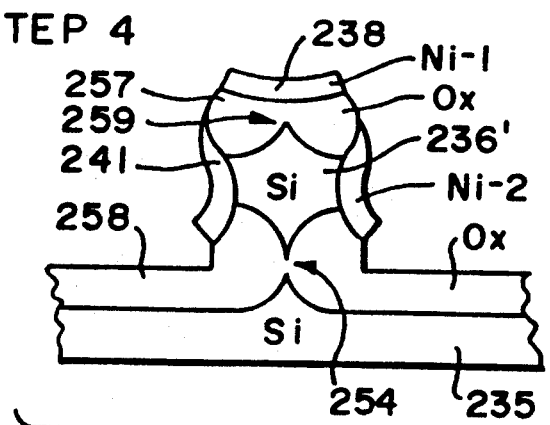
FIG. 11

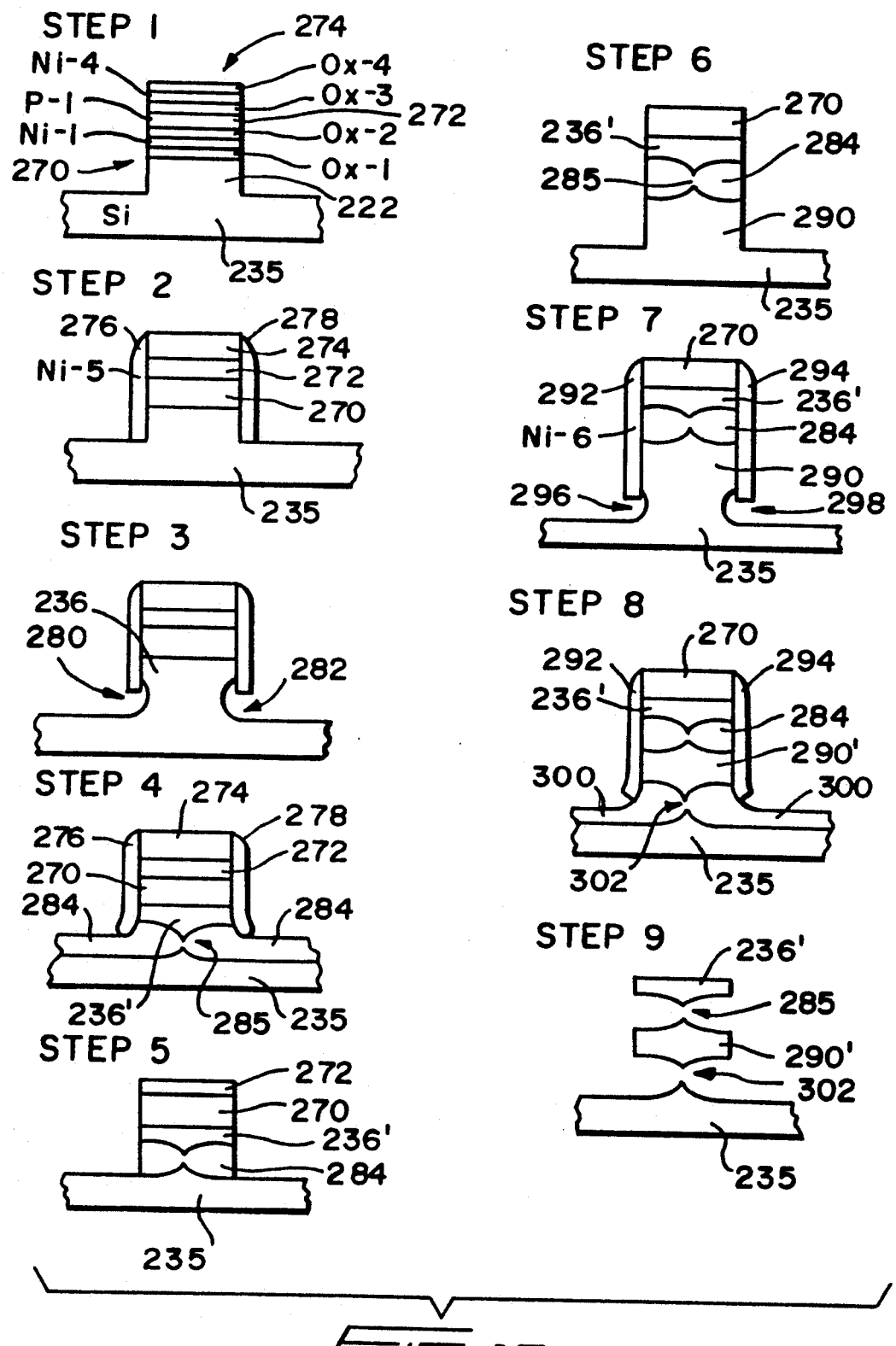

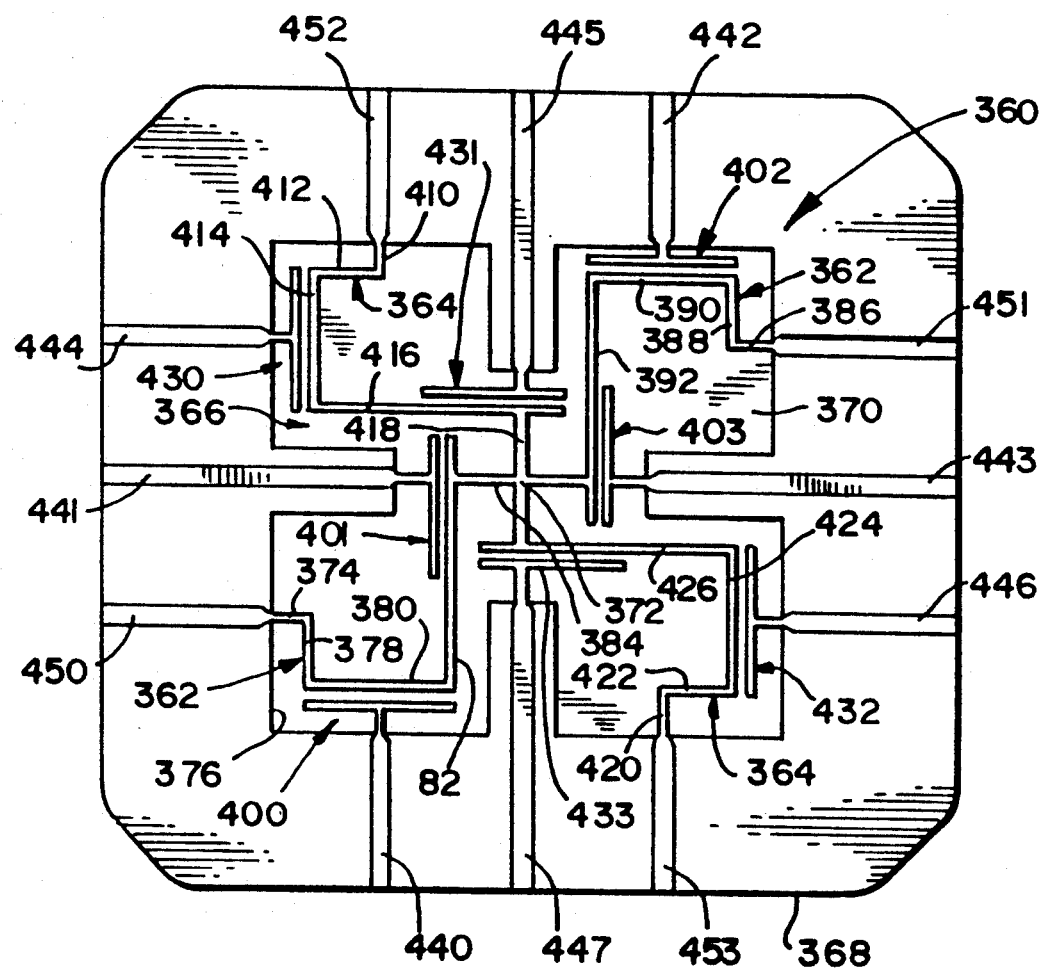
FIG_14

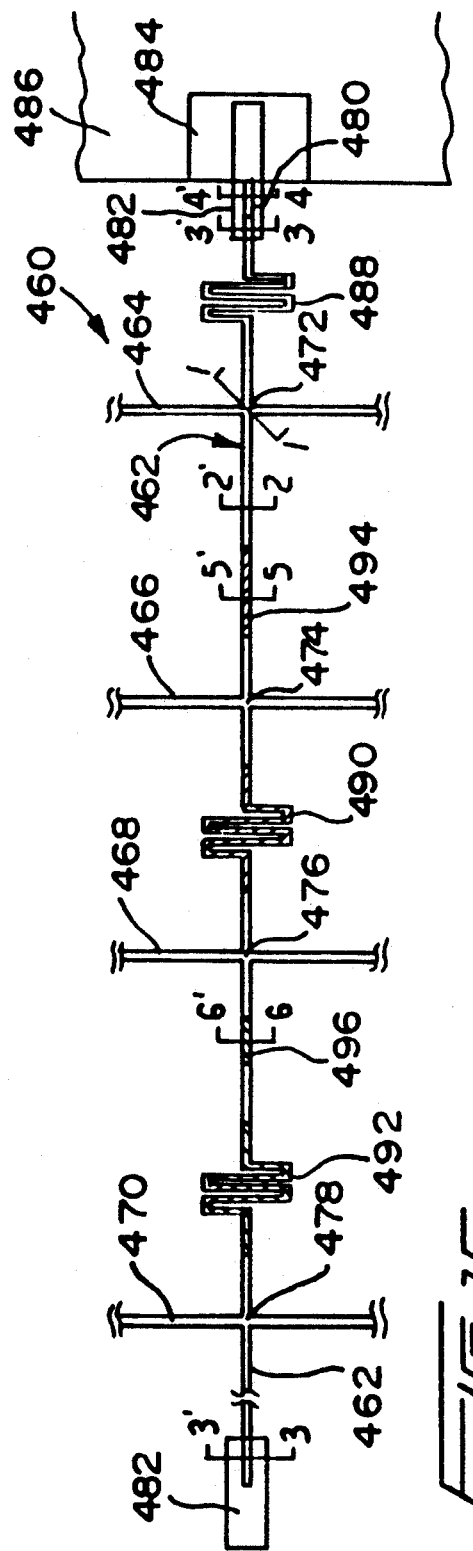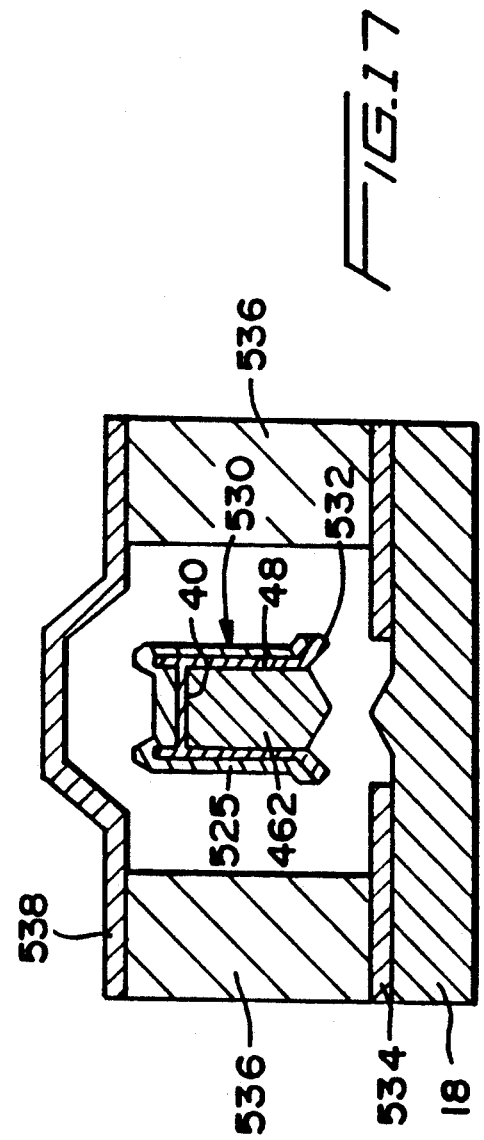

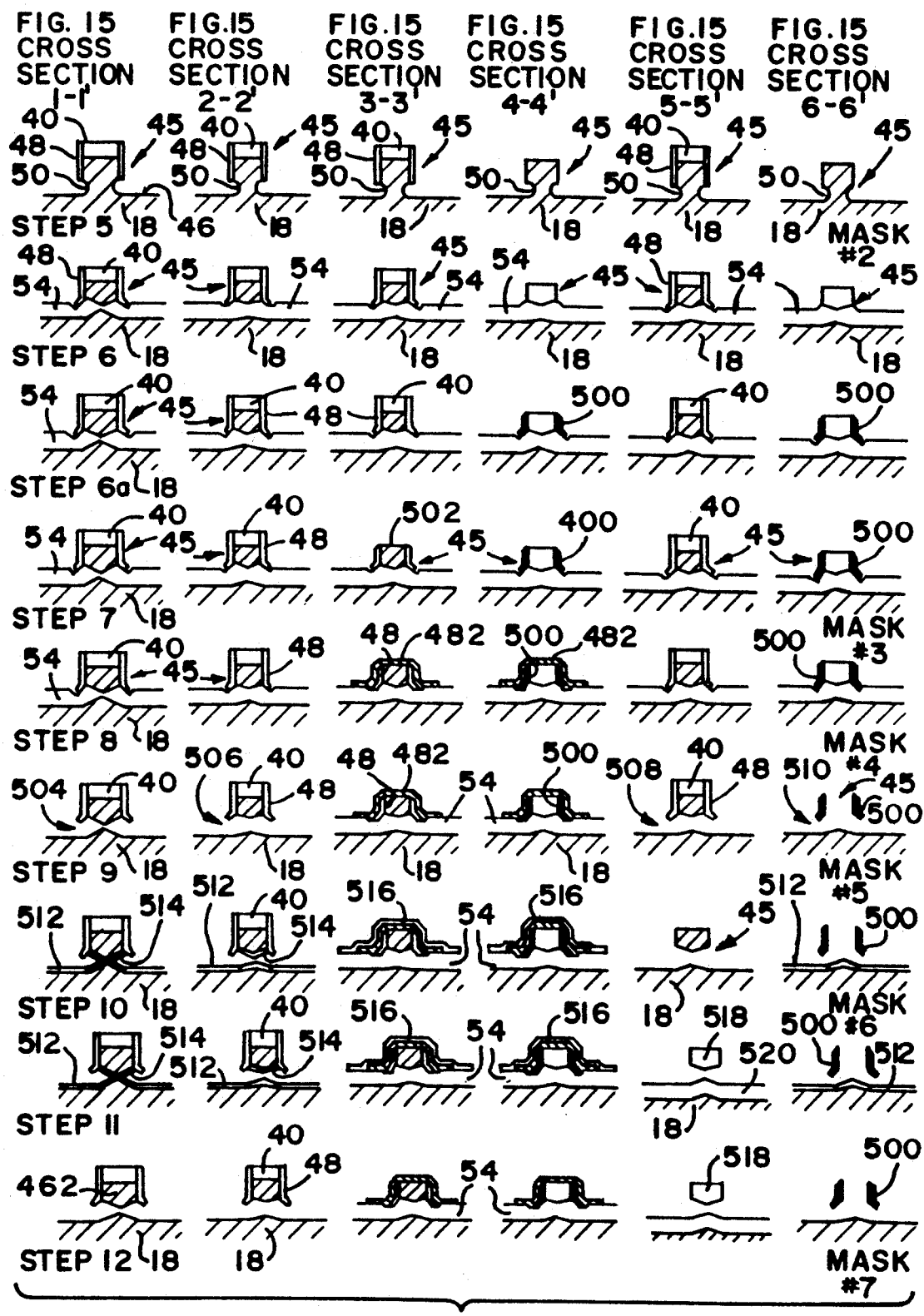

METHODS OF FABRICATING INTEGRATED, ALIGNED TUNNELING TIP PAIRS

This invention was made with Government support under Grant Nos. ECS-8805866 and ECS-8815775, awarded by the National Science Foundation. The Government has certain rights in the invention.

BACKGROUND OF THE INVENTION

This is a continuation-in-part of U.S. application Ser. No. 07/699,390, filed May 14, 1991, now abandoned and entitled "Integrated Scanning Probe".

The present invention relates, in general, to a unique microstructure and to fabrication techniques for such structures, and more particularly relates to self-aligned nanometer sized probe tips and methods for fabricating such tips. Still more particularly, the present invention relates to techniques for fabricating stacked, aligned integrated tunneling tips for use in sensors and analytical instruments based on movable, self-aligned, finely pointed tip pairs. Such pairs are formed on single crystal, polycrystalline, or amorphous silicon beams and are fully integratable with electronic circuits on a silicon chip.

Scanning-probe microscopes are instruments which provide precise surface measurements through the use of a probe positioned in very close proximity to the surface of interest. The probe scans the surface in a controlled fashion to provide information related to the nature of the surface, including its topography and its chemical and electronic structure. Highly resolved spatial measurements of characteristics such as electron energy states, magnetic field strengths and directions, thermal conductivity and response, and interatomic forces can be made with high resolution at or near atomic levels. Many versions of such devices utilize a movable pointed tip that can be precisely positioned in three dimensions.

One of the principle applications of scanning probe microscopy takes advantage of the spatial selectivity of electron tunneling, using a scanning probe as the aperture of the microscope. Such a device, known as a scanning tunneling microscope (STM) does not use an external source of radiation to illuminate a sample under study, but instead uses electrons already present on the surface of the sample and on a finely-pointed tip mounted on the movable probe. Since the device is not limited by the wavelength of a radiation source, its resolution is based on a near-field "aperture" that is a single atom in diameter at the tip of the scanning probe.

The scanning tunneling microscope operates to position an extremely sharp probe tip within a few atomic diameters of a surface to be studied. The STM provides a bias voltage between the tip and sample so that a flow of electrons occurs, with the electrons tunneling from filled states in the surface to empty states in the tip (or vice versa). The tunneling current is measured at multiple points across the surface of the sample, and since the current varies in accordance with the distance between the tip and the surface, this current can be used to control tip height above the surface so that the tunneling current remains constant. Variations in the control signals for positioning the probe and for maintaining this tip height provide a measure of the surface configuration. In addition, since the tunneling current is also a function of the applied tip-to-sample voltage, variation of the bias voltage over a controlled range permits the STM to provide spectroscopic data about the sample. The problem of creating an extremely sharp probe tip has been solved in the past by, for example, sharpening a fine wire of tungsten, platinum, or platinum-iridium by cutting, grinding or etching techniques. The tip is positioned with respect to the surface under study, typically by means of a coarse positioning mechanism which may include a micrometer or similar mechanical mechanism and a fine positioning mechanism which may include the use of piezoelectric material. Such arrangements have enabled the STM tip to be positioned to within fractions of an Angstrom from a surface, thereby enabling the tip to be used to locate small amounts of material, or even individual atoms, in a surface.

Since the magnitude of the tunneling current between a probe tip and a surface is exponentially dependent on the distance between the two, a decrease of one Angstrom in this distance would produce a ten-fold increase in the tunneling current. Such large increases permit the use of a constant-current method of maintaining a constant distance between the scanning tip and the sample surface, and thus provide precise sensing and control of the spatial position of the tip. This precise control is the basis for a large number of tunneling devices and systems in the prior art. Descriptions of scanning tunneling microscopes are found in "Vacuum Tunneling: A New Technique for Microscopy" by Calvin F. Quate, *Physics Today*, August 1986, pages 26 through 33; in "Scanned-Probe Microscopes" by H. Kumar Wickramasinghe, *Scientific American*, Oct. 1989, pages 98 to 105; and in U.S. Pat. No. 4,912,822 to Zdeblick et al, issued Apr. 3, 1990.

A continuing problem in such devices is the provision of accurate sensing of the distance between a tip and a surface to be sensed, and in providing rapid and accurate feedback to move the tip to prevent contact between the tip and the surface. This requires a low mass mounting for the tip so that even minute feedback signals will be sufficient to effect motion of the tip to allow rapid scanning of a surface. Further, to be useful in microelectronics, the device needs to be not only small, but should be of a material which enables it to be integral with the electronic control circuits which regulate its motion and which detect the tunneling current. Preferably, the scanning-tunneling device is of silicon so that it can be integrated on a silicon chip.

Prior devices which have relied on piezoelectric transducers for tracking surface contours and for scanning the tip have required that suitable piezoelectric devices be mounted on the tip or on its support. This has required the additional fabrication step of providing piezoelectric materials on the tip support, making fabrication of the device more complex and more difficult. Furthermore, this additional material affects the mass of the scanning-tunneling device and thus its resonant frequency, thereby limiting control of the motion of the device, and thus limiting its range of operation.

Prior scanning-tunneling devices have mounted the tip adjacent to a surface to be scanned, where the surface is mounted for motion in the X-Y plane, with the tip being movable in the vertical, or Z-direction to prevent contact between the tip and the planar surface. In order to provide a high degree of control of such motion, it has been found necessary to construct such devices so that they are relatively stiff. However, such stiffness not only places limits on the motion of the tip, but also reduces its response to forces such as vibration or acceleration so that the device is less capable of measuring these parameters with high sensitivity. Furthermore, the proximity of the tip to a horizontally extending planar surface does not provide a clearly defined reference point for the detection of relative motion, thus further limiting the use of these devices as sensors.

SUMMARY OF THE INVENTION

It is, therefore, an object of the present invention to provide improved scanning probes having nanometer-scale tips for use in a wide range of structures such as analytical instruments.

It is another object of the invention to fabricate scanning nanometer-scale tunneling tips from single crystal silicon for integration with circuit chips.

Another object of the invention is to fabricate opposed, self-aligned probe tips, one of which serves as reference and the other of which is relatively movable with respect to the reference.

A still further object of the invention is to fabricate mechanical systems integrally on a chip to utilize nanometer-scale motion in sensors and related instruments.

Another object of the invention is to provide nanometer-scale devices integrally formed from single crystal silicon and incorporated with silicon chip structures for response to energy sources such as sound, light, mechanical motion, molecular content of ambient materials, and the like.

A further object of the invention is to provide methods of fabricating opposed, self-aligned probe tips at nanometer scale which are integral with silicon chips.

A still further object of the invention is to provide methods of fabricating stacked, aligned tunneling probe tips at nanometer scale, the tips being formed in pairs or in pairs combined with a protruding single tip.

Briefly, the present invention is directed to improved scanning-tunneling structures, devices and instruments which overcome the shortcomings found in prior devices, and to unique processes for fabricating such devices. Accordingly, the present invention provides novel tip structures for providing increased sensitivity for various instruments such as atomic force microscopes and scanning-tunneling sensor devices, and which may be used in measuring various mechanical, electrical or chemical parameters. The invention also provides a unique mounting structure for scanning-tunneling tips which permits both the detection of and the control of tip motion and which provides unique stacked-tip structures. In addition, the invention provides novel techniques for fabricating such tips and the movable beams on which such tips may be mounted.

In accordance with the invention, the high resolution and excellent patterning capability of integrated circuit microfabrication processes are applied to the fabrication of micro-mechanical tunneling devices in systems to provide ultra-small, low-mass sensors having high natural frequencies with excellent tolerance to low noise perturbations. The microfabrication techniques of the present invention utilize, in the preferred embodiments, the selective oxidation of single crystal silicon to obtain electrically and thermally isolated, released, single crystal silicon structures such as beams and islands, and to obtain nanometer-scale self-aligned tips carried by such beams or islands. Other materials, such as silicon oxide and silicon nitride, may also be used to provide isolation and support for such tips and for their supporting beams. The processes of the invention produce self-aligned tips having conical or wedge shapes in either horizontal or vertical pairs or stacks on movable beams. These beams are separated from the underlying substrate, as by selectively removing supporting material, to provide cantilevered and insulated structures which permit relative three-dimensional movement of tips in the aligned pairs.

The fabrication process of the present invention begins with a structure consisting, for example, of an island which is isolated from an underlying substrate by selective lateral oxidation. This oxidation process, which preferably is carried out in a single crystal silicon substrate, is described in the article entitled "Formation of Submicron Silicon-on-Insulator Structures by Lateral Oxidation of Substrate-Silicon Islands", *Journal of Vacuum Science Technology* B6(1), January/February 1988, pages 341 to 345, by S. C. Arney et al, and produces islands of silicon supported by a thermal oxide, which in turn is carried by a substrate silicon. The process begins with the definition of, for example, 250 nm-wide islands, or mesas, in a substrate material such as single crystal silicon. The islands are of the same material as the substrate and are supported on the top substrate surface. The islands are capped on the top and side walls with a silicon nitride oxidation mask. The structure is then isotropically or anisotropically recess etched around the bottom of the mask to narrow the bases of the islands, and the bases are thermally oxidized in a lateral direction to produce isolated islands. The degree of isolation of each remaining island is tailored by controlling the lateral oxidation of the material connecting the island to the underlying substrate. By controlling this lateral oxidation, the substrate material at the bases of the islands is selectively oxidized until tapered filaments of the substrate material 10 to 100 nm in width are formed between the islands and the underlying substrate. By further oxidation, these filaments can be eliminated at the narrowest parts of the tapered connections, leaving upper and lower self-aligned, opposed tips having ends which taper to the diameter of the connecting filament, or less, thus producing nanometer-range dimensions at the ends of the tips.

In accordance with the present invention, the patterning and etching of the substrate to produce the islands can also be used to produce a beam on which one of the self-aligned, opposed tips is located, with the other tip being located on the underlying substrate. By selectively removing oxidized material from around the tips and around portions of the beam structure, the beam can be mechanically released to permit it to move with respect to the substrate to thereby provide relative motion between the two opposed self-aligned tips. In accordance with the invention, this opposed tip structure can be used in microscopic versions of analytical instruments which are fully integrated with electronic circuits on a semiconductor chip. Such instruments include unique sensors and emitters incorporating the self-aligned opposed tips of the invention and utilize electronic circuits on the same chip which carries the tips and which can detect, for example, the relative position of one tip with respect to the other, can determine the composition of coatings formed on the tips or the composition of materials absorbed by the tips, and can measure various other parameters by detecting and measuring the tunneling currents, the capacitance, and/or field emissions between the tips.

In its simplest form, the invention includes a single beam carrying one of an opposed, aligned pair of tips and mounted as a cantilever with an elongated axis extending over a stationary surface on which the second of the opposed pair of tips is located. The distance between the two tips can be measured by the current flow between the tips, for example, and lateral or vertical motion of the beam-mounted tip with respect to the stationary tip can be easily detected, as by measuring changes in the current flow between the tips, to provide a sensitive indication of tip position or motion. If desired, a second, separate cantilever beam can be mounted with its longitudinal axis at an angle to the axis of the first beam so that the lateral and vertical motion of the two beams in combination effectively allows vibration or other motion in any direction to be detected. Multiple self-aligned tips can be mounted on the cantilever beams and on the adjacent surface, if desired, to provide a broader range of measurements, and additional beams as well as stacked tips can be provided, as well.

The cross-sectional shapes of the opposed tips depend upon the shapes of the islands from which they are formed and upon the precise control of the etching and oxidation steps used to form them. Accordingly, the tips may be generally conical in shape, may be wedge-shaped, may be pyramidal, or may have other cross-sectional shapes. Aligned, opposed conical tips generally will be coaxial when fabricated, and may be in any orientation on a substrate. Generally, conical tips will be aligned on an axis perpendicular to the surface of the underlying substrate, but the axis may be parallel to that surface, or at some intermediate angle or other orientation, if desired. Wedge-shaped tips generally are elongated and taper to a fine line, with opposed, aligned wedge-shaped tips being coplanar. Such wedge-shaped tips usually are aligned in a plane perpendicular to the surface of the underlying substrate, but that plane can be parallel to the substrate or at some intermediate angle or other orientation, if desired. Plural pairs of coaxial or coplanar tips may be said to be stacked.

In the following description, vertically aligned tips are those which are coaxial or coplanar. Such tips may be illustrated herein as aligned along a vertical axis or plane, i.e., on an axis or plane perpendicular to the horizontal surface of the underlying substrate, for convenience of description, but it will be understood that such aligned tips may be at any desired orientation with respect to the underlying substrate. It will further be understood that plural tips may be fabricated along a common axis either in opposed pairs or in such pairs in combination with single aligned tips. Such tips will herein be referred to as stacked tips or stacked pairs of tips.

The beam or beams which support the tips may be formed, through the same patterning and etching techniques used to form the tips, to incorporate mounting springs which permit axial as well as lateral motion of the one or more beams with respect to an adjacent substrate, base, or support structure. In addition, the beams may be formed to incorporate capacitive or magnetic drive structures which may be energized by suitable potential differences or magnetic fields to produce motion in the beams. In addition, piezoelectric films may be incorporated on the beams.

In a preferred form of the invention, a pair of coplanar linear beams may be mounted so as to intersect each other, preferably at right angles, with the beams being connected to each other at their intersection to form an X-shaped tip support in the plane defined by the beams. The beams are mounted by means of axial springs so that each beam is movable axially and laterally within a horizontal plane defined by the beams, and so the intersection is movable in a direction perpendicular to that plane. The springs not only allow motion of the beams, but hold them in place with respect to their supporting structure. One tip of a self-aligned tip pair is formed at the intersection of the beams to detect the relative motion of the beams with respect to a second of the self-aligned tip pair, the second tip being mounted in alignment with the first tip. In accordance with the invention, the second tip may be formed on a planar surface adjacent to the beams so that it is stationary, or may be mounted on a cantilever beam or a second pair of crossed beams also forming an X-shaped tip support. Such a second pair of crossed beams may also be mounted by means of springs so as to lie in a plane parallel to the plane of the first pair of intersecting beams, with each X-shaped tip support being movable in X and Y directions in its own plane and in a Z direction perpendicular to the X-Y planes. The planes of the two tip supports, whether the second support is stationary or is a movable second beam or pair of beams, are parallel to each other and closely spaced, with the tips being self-aligned.

Each pair of beams in the linear crossed-beam configuration preferably carries corresponding capacitive drive structures for controlling and sensing the motion of the respective beams, and thus of the tips which they support in the X-Y (horizontal) plane, and may also incorporate similar drive structures for controlling or sensing motion in the Z (vertical) direction. In a preferred form of the invention, the horizontal capacitive drive consists of movable "comb"-shaped capacitors mounted on each end of each beam between the respective springs and the support structure for the beam. The springs serve as a mechanical bias to produce restoring forces when the beams are moved by energization of the drive capacitors. In addition, opposed capacitive plates may be provided on the beams and on adjacent structures for controlling and sensing vertical motion. Such a structure permits precise and accurate control and/or measurement of the relative motion between opposed aligned tips to allow a wide variety of microscopic and analytical measurements. Such a device may occupy an area of silicon approximately 40 $\mu$m $\times$ 20 $\mu$m, including the actuators and springs, can easily be incorporated in an integrated circuit device, and can produce a displacement of 400 nm at the tips. A conventional piezoelectric device, on the other hand, requires a device 2 mm in length to produce the same displacement.

The "comb" drive structure utilizes interdigitated plates which are parallel to the axis of the supporting beam on which it is mounted. This arrangement has the advantage of producing a drive force that is constant with displacement, and can accommodate a large axial motion in the beam. However, the comb structure does not allow very much lateral motion, so it presents difficulties for the two-dimensional motion in the X-Y plane needed for many sensor and instrument applications. Accordingly, in another form of the invention, the self-aligned, opposed tips are formed at the intersection of a pair of crossed offset beams, wherein each beam is formed of two opposed, generally L-shaped beam segments, with corresponding legs of the segments being interconnected by a tip support leg to form the beam. The intersection of the tip support legs of the two beams forms an X-shaped tip support which carries one of a pair of opposed, self-aligned tips, with the other of the pair being formed on the underlying substrate, for example. Capacitive plates are formed on the sides of each of the beam segments to move the segments laterally, with the resilience of the material from which the beams are formed and the length of the beams serving to provide the spring action required for proper control of the motion of the X-shaped tip support. This arrangement eliminates the need to form axial springs in the support beams, as is required with linear beams, although such springs can also be incorporated, if desired.

The support beams and the self-aligned tips are formed, in accordance with a preferred form of the invention, by first patterning a substrate, such as a single crystal wafer, to define an upstanding island, or mesa, having in the top plan view the shape or pattern of the desired support beam or beams, support springs, drive capacitors, and the like. The island is masked, etched, and oxidized to isolate selected top portions of the island from the supporting substrate to define an isolated beam or other structure, the oxidizing step at the same time forming at one or more selected locations opposed upper and lower tip structures which extend between separated top part of the island, i.e., the beam, and underlying substrate. The oxide between the beam and the substrate is then removed at selected locations to physically separate the beam from the substrate, so that the beam is movable, and so that the tip carried by the beam is movable with respect to its opposed tip on the substrate.

The beam preferably is located within a recess which is formed in the substrate during fabrication of the beam. One end of the beam is fixedly mounted, as on a vertical wall of the recess, on a pedestal formed in the recess, or on some other support structure within the recess, with a movable portion extending horizontally away from the support and spaced above the floor of the recess. The fixed end of the beam may be supported in part by the oxide formed between the beam and the substrate, with most of that oxide being removed to free the movable end of the beam. An oxidation step may be used to electrically insulate selected parts of the beam and its tip from its support structure, and electrical leads may be provided over the insulation to connect the tips to suitable electrical circuits formed in the beam itself or in the surrounding substrate. Other insulating materials such as silicon nitride may also be used to provide electrical isolation of the tips. In addition, tips may be formed on the tops of the beams, through appropriate modification of the fabrication process, and stacked pairs of tips and support beams can be formed.

The device of the present invention is fabricated, in one form of the invention, on a highly arsenic doped silicon wafer substrate (100) with a bulk resistivity of 0.005 ohn-cm or less. A dielectric stack comprised of both oxide and nitride is deposited on the top surface of the wafer to serve as the top mask for later silicon trench etching and isolation oxidation. Designed patterns are transferred to the dielectric stack using high resolution electron-beam lithography and anisotropic reactive ion etching (RIE) in a $CHF_3$ chemistry. Substrate silicon is then etched using RIE in a $Cl_2/BCl_3$ chemistry to form silicon trenches of desired depths which define upstanding islands on the substrate. A sidewall oxidation mask is formed by depositing a second stack comprised of both oxide and nitride; this dielectric stack is then anisotropically etched back using a $CHF_3$ RIE process, leaving only the sidewall portion of the second dielectric stack intact. A silicon recess etch is performed to permit a higher lateral oxidation rate. A high temperature oxidation follows, to thereby define silicon beams that are electrically isolated from the substrate. Note that, by selectively stripping portions of the oxidation mask before the oxidation, mechanically attached silicon beams can be electrically isolated from one another to allow each segment to be individually addressable.

Following the oxidation, contact windows are opened by selectively etching the top dielectric stack using a $CHF_3$ RIE process. The metallization step is completed with an aluminum lift-off using a tri-layer process that involves a thick layer of polyimide planarizing the silicon islands. The field oxide is then selectively removed using a buffered HF solution; this releases the silicon/dielectric beams and leaves them free to move over the substrate silicon wafer surface.

Variations in the foregoing structures and processes will produce devices having a wide range of utility for the opposed tip structure of the invention. For example, one of the tips may be used for lithographic alignment of a feature with respect to the other tip. The movable beam tip support structure can be used, in another example, to move a pointed silicon tip with respect to a surface to function as a scanning tunneling microscope. Alternatively, one of the tips of an opposed pair can be removed from its support structure to form an aperture and the remaining tips can be moved with respect to the aperture to function as an electron microscope cathode. In this latter embodiment, the aperture may be used to produce a high electric field at the remaining tip, so that the tip will emit electrons which then pass through the aperture.

In other embodiments, the silicon tips can be reoxidized to form insulated tips for atomic force microscopes or can be conformally coated with metal such as CVD tungsten to produce metal tips. The tips can also be used to absorb ambient materials for spectroscopic studies, and are available for a wide variety of other functions.

Although the invention in its preferred form includes a pair of vertically stacked, self-aligned opposed tips, with the top one of the pair facing downwardly toward an upwardly-facing bottom tip, the present fabrication process can also be used to provide single tips, vertically stacked multiple pairs of tips, or pairs in combination, with an upwardly-facing, or protruding, last tip on the top of the stack. Such sets of vertically-stacked probe tip pairs can be fabricated by a sidewall patterning technique which permits opening of independent windows in the sidewall nitride carried by the silicon islands prior to the selective lateral isolation oxidation step. The upwardly protruding last tip may be fabricated either by removing the upper tip of a pair, to reveal the lower tip, or by patterning of the sidewall nitride prior to the selective lateral isolation oxidation step so as to allow oxidation of the top portion of the island.

The process of the present invention can be used to fabricate not only self-aligned pairs and stacked pairs of generally conical tips, but self-aligned pairs and stacked pairs of wedge-like tips. Structures which incorporate multiple self-aligned tip structures may be fabricated wherein tips are formed at spaced locations to provide, for example, coarse and fine measurements of relative motion. Furthermore, since the tip structures of the invention are formed in silicon, the same substrate in which the devices are produced can also be used in the formation of integrated electronic devices and circuits, these circuits can be electrically connected to capacitors formed on the beams and connected to the movable tip structures to provide drive signals for motion in X, Y and Z directions and to provide amplifiers for sensing and amplifying signals derived from current flowing between the opposed tips. The beams can be shaped and sized to produce the desired amount of sensitivity or stiffness to permit a wide range of sensing functions, and a variety of transducers, such as capacitors, thin film piezoelectric material, and the like, can be used to sense and to control the motion of the tips.

Although the movable beams are illustrated as being mounted as cantilevers on the walls of recesses formed in the supporting substrate, it will be understood that other support structures can be provided. For example, the beams may be mounted on pedestals on the substrate which may be spaced from the recess walls and which may be the same material as the substrate or may be an oxide formed during the fabrication process. Further, the beams need not be horizontal, and need not be parallel to an underlying substrate floor, but may be formed at any desired orientation. The tips or wedges may be horizontally aligned or vertically aligned, as illustrated herein, but it will be understood that this is for simplicity of description, and that the axis of alignment of opposed tips may be at any desired orientation.

Although various arrangements of single and stacked tips are possible, it is in general preferred that at least one tip of a stack, or assembly, be stationary relative to the remaining tips to serve as benchmark, or reference point, for detecting and measuring motion or other parameters. The use of an upstanding tip extending above a surrounding surface is particularly useful as such a benchmark, not only because it is easy to locate with an opposed tip, but because it permits the use of capacitive, field emission and/or tunnelling effects for the measurement of a wide range of parameters. A lateral tip pair may be similarly configured with one mobile and one fixed tip, the fixed tip serving as a benchmark and permitting the use of capacitive, field emission and/or tunnelling effects.

BRIEF DESCRIPTION OF THE DRAWINGS

The foregoing, and additional objects, features and advantages of the present invention will become apparent to those of skill in the art from the following detailed descriptions of preferred embodiments thereof, taken in conjunction with the accompanying drawings, in which:

FIGS. 1 and 1A are perspective views of a cantilevered beam incorporating self-aligned nanometer-sized conical tips in accordance with the present invention;

FIG. 3 is a top plan view of a structure incorporating linear tip support beams fabricated in accordance with the process of FIG. 2;

FIG. 5 is a perspective view of a pair of opposed, self-aligned wedge-like tips formed in accordance with the present invention;

FIG. 6 is a side elevational view of a tip structure modified to incorporate a MOSFET device;

FIG. 7 is a perspective view of an island structure with a protective mask for forming horizontal self-aligned wedge-like tips in accordance with the process of the present invention;

FIG. 8 is a cross-sectional view of the structure of FIG. 7;

FIG. 9 is a perspective view of horizontal self-aligned wedge-like tips formed from the structure of FIG. 7;

FIG. 10 illustrates, in tabular form, a preferred process for forming self-aligned multiple, vertically stacked tips, which may be wedge-shaped conical tips formed in pairs;

FIG. 11 illustrates, in tabular form, an alternate to the method of FIG. 10, wherein the uppermost tip is a single tip;

FIG. 13 illustrates in tabular form, still other processes for fabricating multiple vertically stacked tips;

FIG. 14 is a top plan view of a structure incorporating offset tip support beams fabricated in accordance with the present invention;

FIG. 15 is a diagrammatic illustration of a beam structure formed using variety of construction techniques for a beam capable of carrying multiple tips;

FIG. 16 illustrates, in tabular form, the process steps for the beam of FIG. 12;

FIG. 17 is a diagrammatic illustration of a structure for producing Z-axis motion;

DESCRIPTION OF PREFERRED EMBODIMENTS

Figure 1A:
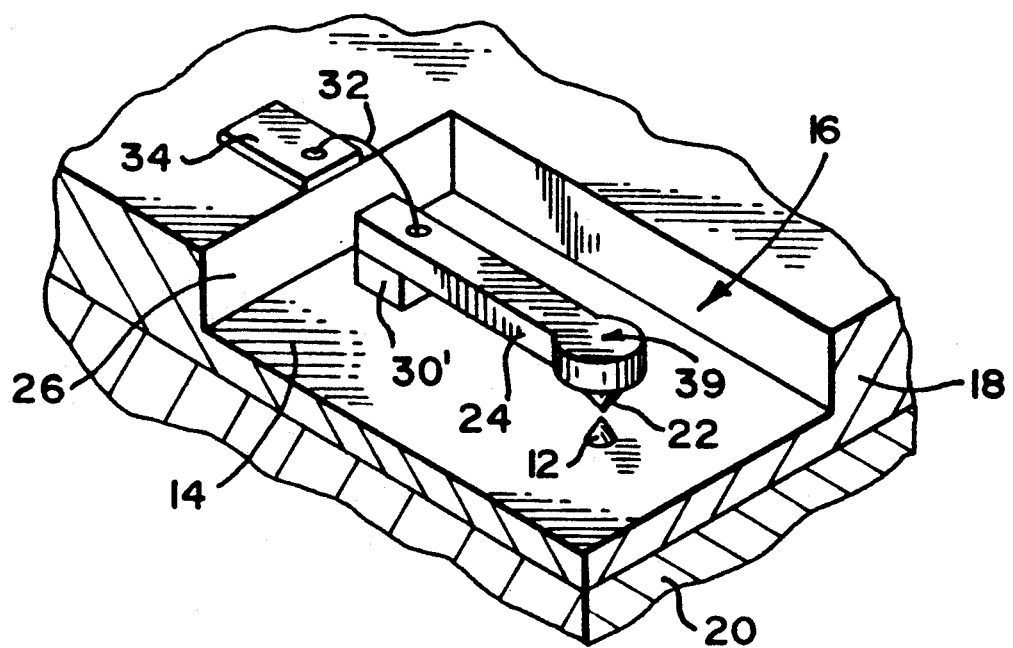

An example of a self-aligned, dual tip structure for analytical instruments in accordance with the present invention is generally indicated at 10 in FIG. 1, to which reference is now made. As there shown, a first, generally conical tip 12 is formed on a horizontal planar floor 14 of a recess 16 formed in a surrounding substrate material 18 carried on a base 20. The substrate 18 and the tip 12 are integrally formed from the same material, which preferably is a single crystal silicon, polycrystalline silicon, or amorphous silicon. The substrate may be a membrane, but preferably is mounted on base 20, which may be an insulating wafer, by bonding, zone melting, recrystallization or the like. The tip 12 is fully integrated into the substrate material 18; that is, it is formed as a part of the crystalline substrate rather than being added on to it, and is fabricated during the formation of other components of the device, as will be explained.

Positioned above and aligned with tip 12 is a second, opposed, generically conical tip 22, preferably also formed from the single crystal silicon material of the substrate 18 at the same time that tip 12 is fabricated. This tip 22 preferably is mounted for relative motion with respect to tip 12, as by means of a cantilever beam 24 mounted on a stationary support such as wall portion 26 of recess 16 and extending outwardly from the wall into the recess. The beam extends over and is parallel to the floor 14 of the recess, in the illustrated embodiment, and is formed to have some flexibility so that it can move with respect to tip 12, the selected degree of flexibility depending upon the application to which the tip structure is to be placed. If the device is to be sensitive to acceleration or vibration, for example, then the beam 24 would have a high degree of flexibility to permit relative motion of the beam with respect to the benchmark provided by stationary tip 12 in response to such mechanical forces.

A greater degree of stiffness would be provided for beam 24 to prevent relative motion between tips 12 and 22 in those cases where the tip is to be used, for example, for chemical spectroscopy. In the latter case, the absorption of a material into the tips 12 and 22 or the coating of the tips by a material in the ambient atmosphere surrounding the tips provides a measure of that material, and the current flow or changes in the current between the two tips is a measure of quantities such as the chemical composition of the material absorbed or coated. In this circumstance, it is desired that the current flow between the tips not be affected by relative movement thereof, but instead only by the changing chemical composition of the tip surfaces.

Since beam 24 is formed of a conductive or semiconductive material, it may be electrically insulated from the substrate 18 as by means of an insulating section 30 formed in the beam. A suitable connector 32 such as an aluminum conductor may then be provided between the conductive portion of the beam and a connector pad 34 located on an insulating layer 35 formed on the surface of the substrate 18, as diagrammatically illustrated in FIG. 1. This permits electrical connection between the tip 22 and electrical circuitry diagrammatically illustrated at 36, which may be formed elsewhere on the substrate 18. Such circuitry, which may be as simple as a current detector, for example, can be routinely fabricated on silicon wafers by well-known techniques. Such circuitry may be used to measure changes in current flow, capacitance, field emissions and the like between the tips 12 and 22, which changes may be a function of material coated on or absorbed by the tips, or may be a function of the spacing between the tips. If the beam 24 is sufficiently flexible, acceleration or vibrational forces imposed on the beam at an angle to its axis 37 will cause the tip 22 to move slightly out of alignment with the tip 12, or to move vertically toward or away from tip 12, thereby changing the current flow therebetween, and such a change can be related to the degree of motion, and thus to the imposed acceleration or vibrational forces.

As will be more fully explained below, in addition to, or instead of, simply measuring the changes in current flow between the tips of the device of FIG. 1, transducers for controlling the motion of the beam 24 and tip 22 with respect to the tip 12, or for sensing such motion, can be provided. Such transducers preferably include capacitive plates mounted on the movable beam and on the stationary side or bottom walls of the recess 16 or on a top wall if one is provided over the beam to enclose the recess, for producing relative motion between the tips. Electrostatic forces are applied to the capacitor plates as by applying a high frequency alternating voltage across opposed plates to produce corresponding relative motion between the movable tip 22 and the stationary tip 12. The voltage across such capacitive plates is also responsive to any motion of beam 24 in response to external forces which produce a variation in the spacing between or the alignment of the plates, for such a change in spacing varies the electrostatic charge across the capacitive plates. This change in the electrostatic charge can provide a direct measure of such motion. In practice, the beam may be vibrated at a high frequency, with any small changes in the motion of the beam being detectable by measuring variations in the charge across the plates.

As an alternate to the capacitive plates, the beam can be moved, or its motion detected, by means of a magnetic film formed as a coating 38 on one or more surfaces of beam 24 and responsive to magnetic fields generated by nearby inductors. The beam can also be moved, or its motion detected, by a piezoelectric film at 38 on one or more surfaces of the beam. Suitable electrodes (not shown) connected to the piezoelectric film provide the required energization.

Although the tips 12 and 22 are shown and described herein as being vertically aligned, it will be understood that they can be horizontally aligned or in any other aligned orientation. If relative motion is to be sensed, then it is preferred that one of the tips be mounted on a movable support such as the beam 24, while the other is mounted on a stationary support, such as the base 20, although both can be mounted on movable supports. Furthermore, although conical tips are illustrated in FIG. 1, it will be understood that elongated, wedge-shaped tips with opposed edges being mounted opposite to and aligned with each other may be provided, as will be more fully explained below.

As is known in scanning tunneling microscopy (STM), the conical tip 22, and in accordance with the present invention, the conical tip 12, both taper to extremely fine, nanometer-scale dimensions, ideally with each tip terminating in a single atom. In known STM devices, the end of tip 22 would be positioned within a few Angstroms or less of a surface to be detected. However, in the present invention the terminal end of tip 22 is positioned within a few Angstroms of the opposed terminal end of the self-aligned tip 12. The close proximity of the terminal ends of these tips allows electrons to tunnel between them upon application of a slight bias voltage. Although the tunneling current is very small, typically on the order of picoamperes, it is measurable, since the value of this tunneling current changes exponentially when the tip to tip distance varies by a small amount; for example, a change of one Angstrom in the gap between the tips will change the tunneling current by an order of magnitude.

The cone-shaped tips 12 and 22 are axially aligned in their nominal, or rest, positions; in the embodiment of FIG. 1, tip 12 is stationary and extends upwardly from surface 14 to serve as a benchmark, and tip 22 is mounted on relatively movable beam 24. The beam has a longitudinal axis 37, and its cantilever mounting allows motion in any direction perpendicular to that axis. Any such motion changes the nominal distance between the opposed terminal ends of the tips 12 and 22, and thus changes the length of the tunneling path and varies the tunneling current, as discussed above. Measurement of this current provides a measure of the mechanical motion of the beam 24. Because of the conical shapes of the tips and the fact that tip 12 is upstanding from surface 14, even lateral motion of the beam in directions parallel to the surface 14 will produce a measurable variation in the tunneling current, thereby permitting measurement of horizontal motion.

The provision of a benchmark tip extending above the surrounding surface facilitates the location of the upper movable tip, for the two tips effectively act as the opposite plates of a capacitor. By measuring the variations in capacitance, the upper and lower tips can be precisely aligned and then the movable tip can be moved close to the stationary tip to precisely position the movable tip above the surface at the desired location. Then the tip can be moved from side to side in the region of the benchmark to obtain a very accurate measure of the surrounding surface.

Instead of operating the tips as a capacitor, it is also possible to operate than in a field emission mode to provide precise location of one with respect to the other. In this case, a potential is applied across the tips, and the resulting field can be measured precisely to allow alignment and positioning of the movable tip with respect to the benchmark. When the tips are very close together, tunnelling of electrons between the opposed tips can be used for the same purposes.

In the absence of tip 12, however, the measurement of motion parallel to the surface 14 is dependent on variations in the topography of the surface, and this is harder to detect and may not be measurable if the distance between tip 22 and the surface remains constant. Thus, the aligned dual tip structure of the present invention provides a significant advantage over prior single tip structures.

FIG. 1A is a modification of the embodiment of FIG. 1, wherein similar parts are similarly numbered. In this illustration, however, the cantilever beam 24 is not mounted on the wall 26 of recess 16, but instead is supported in cantilever fashion on a pedestal 30' which is unitarily formed on the floor surface 14 of the recess. The fixed end of the cantilever 24 is stationary, with the beam extending outwardly from the pedestal in a direction generally parallel to floor 14 of the recess 16. The pedestal preferably is fabricated in the course of forming the beam, and thus is unitary with the wafer 18. Although the pedestal may be silicon, if desired, it is preferred that it be of an electrically insulating material such as silicon dioxide, formed at the same time in the fabrication sequence as is the insulation 30 in the device of FIG. 1. The pedestal structure provides great freedom in locating the arm 24 within the recess 16, and thus may be preferred in some embodiments of the invention.

The beam 24 detects motion in horizontal, vertical, and intermediate directions perpendicular to its axis. By providing a second cantilevered beam (not shown) similar to beam 24 but having its axis perpendicular to the axis of beam 24, motion in three dimensions can be detected; however, this would require two pairs of opposed, self-aligned tips, one on each beam. An alternative method of detecting three-dimensional motion using just one aligned pair of tips is illustrated in FIG. 3, and involves the provision of intersecting, spring-mounted beams. The spring mountings for the intersecting beams, which preferably are perpendicular to each other, effectively permit motion of one tip not only laterally with respect to one of its mounting beams, but axially along that beam, and by using crossed beams which are both mounted for three-dimensional motion, the tip is not only capable of detecting motion in any direction, but can be controlled to precisely position one tip with respect to the other for measurements of a wide range of parameters. The mounting for three-dimensional motion is of particular value in detecting and measuring vibrations and other mechanical motions, for the extreme sensitivity of tunneling currents to changes in distance between the tips in the structure of the present invention provides a highly precise instrument for such measurements.

In addition, the data provided by changes in the tunneling current flow between opposed tips provides information on the filled and unfilled electron energy states of the opposed tips. This data reveals information about the chemical composition of these tips and about molecular bonding as well as electronic and magnetic states within the tips, their crystalline structure and other characteristics so that the opposed tips of the present invention can be used as a tool for spectroscopy. Such measurements are accomplished by precisely varying the bias voltage and/or the tip-to-tip distance to provide two related types of spectroscopic measurements: 1) current versus voltage and 2) current versus distance. Current versus voltage spectroscopy is carried out by maintaining the gap between the tips constant and measuring the tunneling current, while varying the bias voltage in discrete steps. Current versus distance spectroscopy is performed by holding the bias voltage constant and measuring the tunneling current, while varying the gap between the tips in discrete steps. From this information, data on the chemical composition of the surface of the tips, the composition of material absorbed by the tips, the crystalline structure, the bonding of the surface material, and the like, can be obtained.

Figure 2:
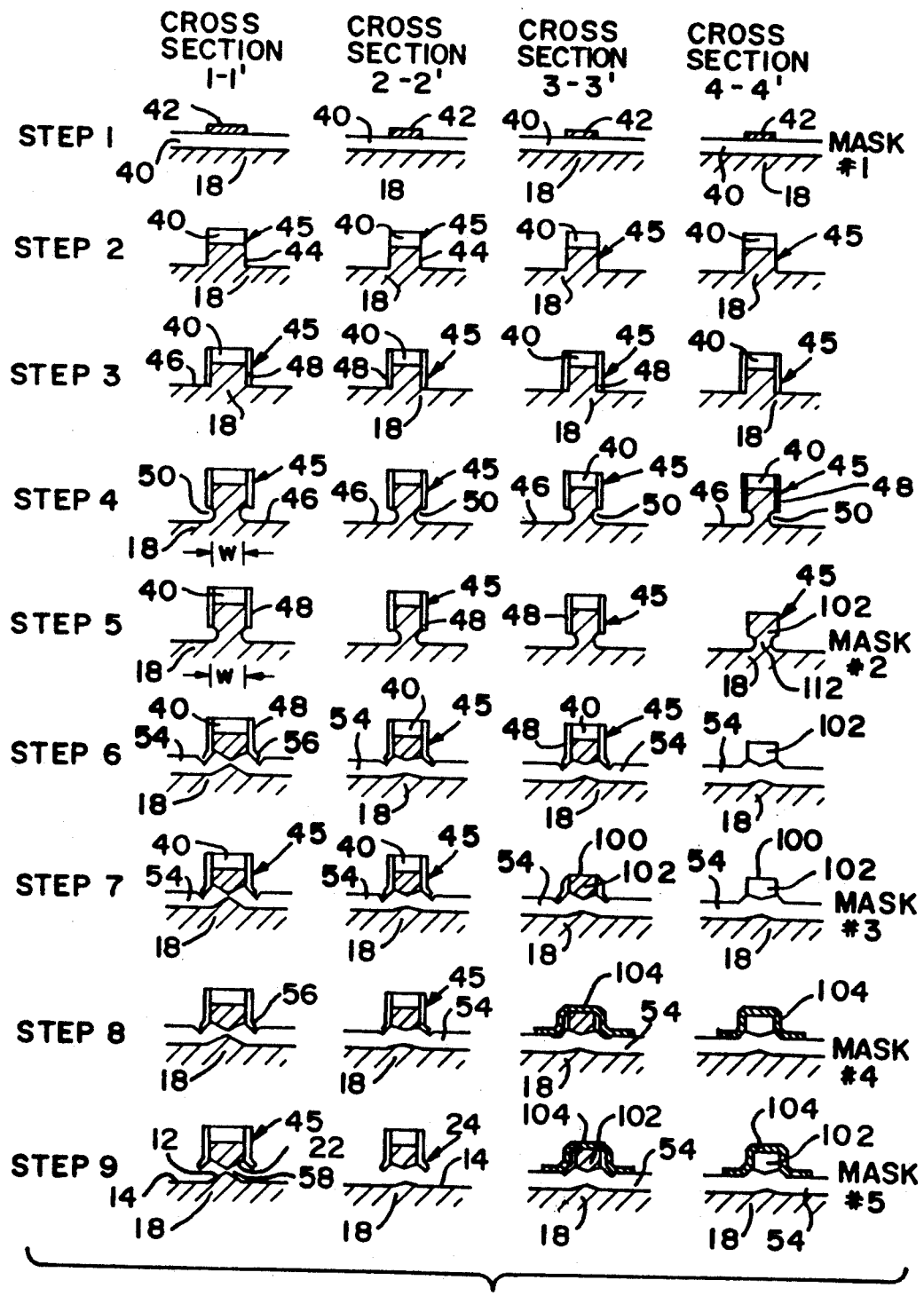
FIG. 2 illustrates, in tabular form, the process steps used to form the various cross-sections of a structure fabricated in accordance with the present invention.

A preferred method of forming the opposed, integral, self-aligned tips 12 and 22 of FIGS. 1 and 1A is illustrated in FIG. 2 in the sequence of steps shown under the heading "Cross Section 1—1'". This sequence refers to a sectional view of the structure of FIG. 1 taken along line 1—1' of the beam 24. The method illustrated in FIG. 2 is related to the "isolated islands of substrate silicon by selective lateral oxidation" (ISLO) technique which is described in the *Journal of Vacuum Science Technology* article identified above. The process of fabricating silicon-on-insulator structures is used in this technique because an isolated island can be formed from high quality, single crystal substrate silicon through the use of a high quality thermally grown silicon oxide insulator. In general, the method utilizes a top surface and side wall surface silicon nitride mask to protect the top part of an island from oxidation while the bottom of the island is oxidized in such a manner that the substrate silicon forming the island is undercut by the oxidation. This oxidation electrically isolates the top of the island from the substrate, to form an isolated beam spaced above the substrate and supported by oxide. The ISLO process produces a structure in which self-aligned pointed tips are formed between the resulting upper silicon island portion, or beam, and the lower silicon substrate when the undercutting oxidation fronts come together to isolate the island from its silicon connection to the substrate. The free end 39 of the beam (FIG. 1) is shaped to have an enlarged profile (as viewed from the top), which may be any desired shape. Because the undercutting oxide moves at the same rate at all locations along the length of the beam 24, the oxide will undercut the beam completely so that the beam will be mechanically released from the substrate, while permitting formation of opposed tips at the center of the enlarged portion.

As illustrated in FIG. 2, the starting substrate preferably is an arsenic-doped, n++ type, less than or equal to 0.005 ohm-centimeter, (100) silicon wafer 18 on which is coated a suitable dielectric layer 40 which includes silicon nitride. For example, the layer 40 may be an oxide-1/-nitride-1/oxide-2(30/100/300 nm) dielectric stack covering the top of the island which is to be formed during oxidation. The relative thicknesses of the layers may vary; however, it is important that the layer 40 includes nitride as an oxidation mask. The dielectric stack is then patterned at step 1 by Mask #1 using, for example, trilevel resist, direct-write electron beam lithography and an aluminum lift off, to form mask 42 in the desired shape (top view) of the beam 24. Thereafter, the dielectric layer 40 is etched around the mask 42 by reactive ion etching (RIE) in a $CHF_3$ chemistry without erosion of the aluminum mask 42 and this mask is then further used to transfer the pattern into the silicon 18 during a subsequent trench etch (step 2). A $Cl_2/BCl_3$ chemistry consumes the aluminum layer 42 but leaves the top surface oxidation mask formed in layer 40 virtually intact, as illustrated in step 2 of cross section 1—1' in FIG. 2. The trench etch produces a cavity in the substrate surrounding an upstanding island, or mesa, of silicon and having a side wall 44 which may be, for example, 500 nm or more deep. The remaining island, generally indicated at 45, has a shape which is defined by mask 42 and the corresponding oxidation mask formed by the top surface layer 40.

The silicon wafer 18 is then completely coated with a second dielectric layer including silicon nitride, and this layer is then anisotropically etched to clear the bottom wall 46 of the trenches and the top surface 47 of layer 40, as indicated in step 3 of the cross section 1—1'. The second dielectric (nitride) layer remains on the side wall 44 of the island, as illustrated by nitride layer 48. The thick oxide layer 40 on the top of the island insures that the par of the second dielectric layer which was deposited on the horizontal surfaces, such as on the surfaces 46 and 47, can be over-etched to expose the silicon substrate 18 in the trench around the island 45, without eroding the nitride masking layer 40, as illustrated in step 3 of FIG. 2.

As illustrated in step 4 of cross section 1—1', an isotropic recess etch is next performed to etch the surface 46 of the silicon layer 18 to thereby produce a recess 50 in the sides of the island 45 beneath the nitride 48 on the side walls of the island. The purpose of this recess is to encourage lateral oxidation of the island 45 beneath the region protected by nitride layer 48 during the oxidation step to be described. As illustrated, this etching step reduces the width W of the island in the region of the recess 50.

It should be noted at this point that the island 45 may have any desired shape in its top plan view, and thus may be rectangular, round, square, or configured in any desired way, depending upon the desired shape and dimensions required for the support beam 24 and the tips 12 and 22. If conical tips are desired, the island preferably will be round in top plan view in the region where the tips are to be formed, as illustrated at 39 in FIG. 1, while if wedge-shaped tips are desired the island would be an elongated rectangle in top plan view. In any case, the side wall 44 of the island is protected by the side layer 48, and the recess 50 is formed beneath the layer 48 to extend completely around the island, the recess being circular in the case of a circular island and being linear and extending along each edge of the island in the case of a rectangular island, for example.

Step 5 of the process illustrated in FIG. 2 is a selective stripping of the dielectric layer 40 from the island 45 to permit selective oxidation of parts of the island for the purpose of providing electrical isolation of the remainder of the island. This is not illustrated at the cross-section 1—1', since that is the location of the tips 12 and 22, but such oxidation may be provided at other parts of the beam structure 24, as will be set forth in greater detail below. Such a selective stripping of portions of the dielectric layer at step 5 is carried out by means of mask number 2 used in this process.

Thereafter, oxidation of the exposed silicon material 18 is carried out to form a silicon dioxide layer 54, as illustrated in step 6. The oxidation extends laterally into the recess 50, thereby reaching under the part of island 45 protected by layer 48. As the oxidation process proceeds, it forms layer 54 on surface 46 and in recess 50. The oxide pushes the lower edge of the layer 48 outwardly, as illustrated at 56 in step 6 of FIG. 2, as the oxidation process proceeds. At any given time, the oxidation proceeds at a substantially constant rate at all points in the silicon material, but the rate falls parabolically with time as the process continues. The deeper the recess 50, the more quickly the top part of island 45 will be undercut and isolated from substrate 18 by the oxidation process.

The isotropic etching of the recess 50 in step 4 produces a rounded profile for the recess, as illustrated in steps 4 and 5, and this profile is preferred since it gives sharper tips upon completion of the oxidation step. However, the profile of the etched recess can be varied, if desired, to control the curvature of the tip surfaces and the sharpness of the opposed tips. Alternatively, the different oxidation rates which occur at different planes of the crystal structure of the silicon can be used to tailor the curvature and sharpness of the tips produced by this process.

The width W of the island (or its diameter in the case of a round island) in the region of the recess 50, illustrated in steps 4 and 5 of cross section 1—1', dominates the undercutting process since during oxidation the laterally growing oxidation fronts approach each other at the same rate at a given time, whether the island is wide or narrow. Thus, it is the shape of the island, together with the length of time the island is subjected to the oxidation step which determines which parts of the island will be undercut, whether the island will be completely undercut in any location, and if completely undercut, the dimension of the gap between the remaining top part of the island and the substrate. If a plurality of beams and tips are made at the same time, the parts of the beams to be undercut, and the gaps for each pair of tips is determined during the first masking step, by the selection of the size (width or diameter) of the island portion corresponding to each pair of tips, for this will control the degree of undercut for a given time period of isotropic etching and for a given time period of oxidation. The process thus may produce islands or parts of islands which are totally undercut, which are partially undercut, which form tips which are closely or widely spaced or, in extreme cases, islands which are nearly consumed by the oxidation, all during the same time period, and in this way the isolation of the supporting beams and the gaps formed by the oxidation process on different beams and tips can be controlled by controlling the sizes and shapes of the corresponding islands.

At the completion of the oxidation, selected portions of the dielectric layer 40 again are stripped, in step 7, by means of mask number 3 for the purpose of providing electrical contacts on parts of the structure. At the cross section 1—1', the dielectric layer 40 remains intact, but at other sections of the structure, such as along the beam 24, the dielectric material may be removed to permit formation of an electrical contact. Such contacts are formed in step 8 by the deposition of a conductive layer of material in the patterned locations previously stripped of dielectric material for this purpose. Again, this is not illustrated at the cross section 1—1' in FIG. 2, since no electrical contact is to be made at that location.

The final step (step 9 in FIG. 2) is the release of selected structures formed by the oxidation process. This is accomplished by stripping away the oxide layer 54 in selected locations, as determined by Mask #5. The oxide may be retained in some areas such as in the area of the pedestal 30' in the device of FIG. 1A, to serve as a support for portions of the structure, but wherever relative motion is desired, as at the tips 12 and 22 illustrated at step 9, and the adjacent areas of the supporting beam, the oxide is removed. This removal of the oxide leaves a gap between the isolated island structure and the underlying substrate to release the support beam 24, and in particular leaves a gap 58 between the terminal ends of the axially aligned tips. The length of the gap along the tip axis depends on process parameters, but in any event preferably is sufficiently small to permit tunneling currents, field emissions, and/or capacitive currents between the opposed tips. Through careful control of the etching and oxidation steps, as described above, the tips are provided with sharp terminal ends opposing each other across gap 58. The top part of island 45 is released along a selected portion of its length so that island 45 forms a movable cantilever beam 24 above the floor 14. If desired, the tips may be coated, for example by selective CVD metallization, after the removal of oxide layer 54.

Beam 24 is produced by the same process as described above for the tips 12 and 22, and this process is illustrated in FIG. 2 for cross-section 2—2' of FIG. 1. Accordingly, at step 1 for section 2—2', the silicon wafer 18 is coated with dielectric layers which are then patterned by mask No. 1 to produce mask 42, as described with respect to cross-section 1—1'. The pattern of mask 42 is then transferred by an RIE step through the dielectric layer 40 and into the silicon substrate 18 to form island 45 (step 2). The wafer is coated with a second dielectric material which is then anisotropically etched back, leaving only the side wall layers 48 intact, as illustrated in FIG. 2 at step 3 for cross-section 2—2' of the beam 24.

As illustrated in step 4, an isotropic recess etch is next performed to produce recess 50, and thereafter, at step 6, selective lateral oxidation of silicon is used to fully isolate the island 45 from the substrate. Since no tips are to be formed at this location, the width of the island has been made sufficiently narrow (by means of mask 42) to insure complete oxidation across its width and thus to insure complete isolation and separation of the upper part of the island 45. At step 7, selected portions of the dielectric layer 40 may be stripped for electrical contact purposes through the use of mask No. 3 and thereafter, at step 8, a conductive layer of material may be deposited and patterned to form electrical contacts using mask No. 4. These particular steps are not performed at cross-section 2—2', but may be performed at other locations along the beam, as will be described hereinbelow. Thereafter, as indicated at step No. 9, mask No. 5 may be used to strip selected portions of the oxide layer 54 through isotropic etching, to mechanically release the beam 24, leaving it free for motion with respect to the floor 14.

As indicated above, the cantilever beam 24 of FIG. 1, which is formed by the process illustrated in FIG. 2 is movable in the horizontal plane parallel to the floor 14 and is movable vertically with respect to the floor; i.e., it is movable in directions perpendicular to the axis 37 of the cantilever beam. However, in the structure of FIG. 1, the beam 24 is not movable axially. As a result, the device can detect and measure vibration and other mechanical motions having components in directions perpendicular to the axis, but not along axis 37. To detect motion along that axis, a second, independent cantilever beam may be formed from the substrate 18, with the axis of the second cantilever being perpendicular to axis 37 and preferably also extending parallel to floor 14. The two cantilever beams preferably have the same structure, and both include opposed self-aligned tips so that together they will permit detection of motion in their common plane (the X-Y plane), and both will provide a measurement of motion in a direction perpendicular to the X-Y plane (the Z direction). Because the terminal ends of the tips 12 and 22 are extremely small, the cantilevers are capable of detecting and measuring extremely small movements.

Figure 4:
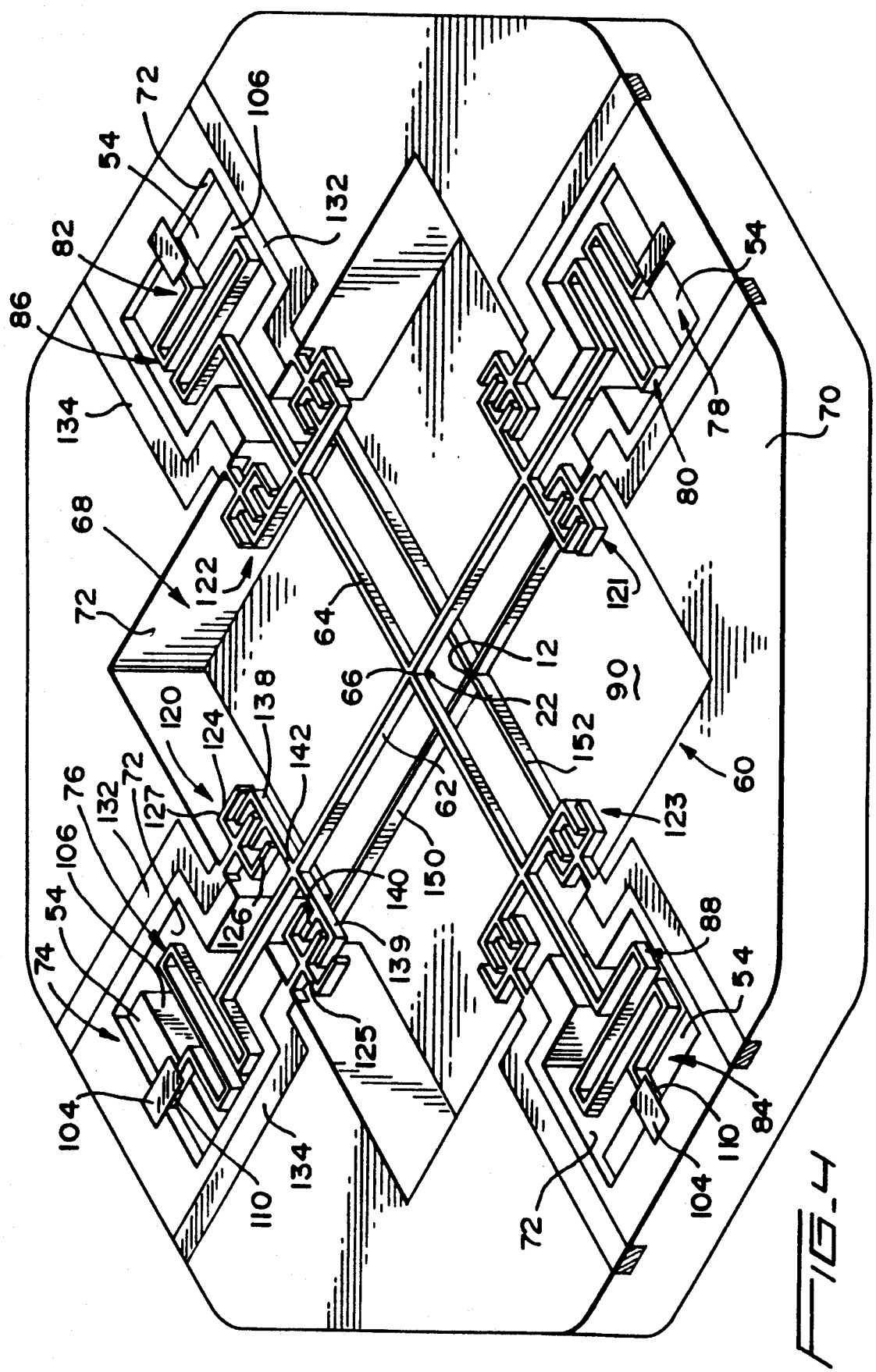
FIG. 4 is a perspective view of the structure of FIG. 3.

In another form of the invention, illustrated in FIGS. 3 and 4, the motion of a single tip 22 in three dimensions with respect to a corresponding, self-aligned, opposed, stationary benchmark tip 12, or with respect to a surface if desired, may be measured by means of a planar, X-shaped tip support structure 60 formed by a pair of intersecting and interconnected beams 62 and 64 which perform the functions of the two separate, perpendicular cantilever beams 24 mentioned above. Beams 62 and 64 preferably are perpendicular to each other and are interconnected at their intersection 66 to form an X-shaped tip support structure. The tip 22 is formed at the intersection 66 and extends downwardly toward a stationary tip 12, in the manner illustrated in FIG. 1 for the tip carried by cantilever beam 24, and as further illustrated at step 9 of cross-section 1—1' (FIG. 2). As was the case with beam 24, the beams 62 and 64 are formed from the silicon substrate 18 in the process illustrated for cross-section 2—2' of FIG. 2, with the substrate being patterned to produce the X-shaped support 60 at the intersection of the beams. The cross-sections 1—1' and 2—2' illustrated in FIG. 3 for the beams 62 and 64 are fabricated utilizing the process of FIG. 2 illustrated for these cross-sections.

In accordance with a preferred form of the invention, the X-shaped support 60 is located in a recess 68 formed in a substrate 70, which may be a silicon wafer of the type described with respect to FIG. 1. The recess, which is formed by the masking and etching steps described with respect to FIG. 2, has a continuous vertical side wall 72 to which the beams 62 and 64 preferably are secured, generally in the manner of cantilever 24 in FIG. 1, although it will be understood that they can be supported by pedestals in the manner illustrated in FIG. 1A. In the illustrated embodiment, however, each of the beams extends completely across the recess and is connected to opposite parts of the side wall 72 at its opposite ends. In order to allow the tip formed at intersection 66 to be movable in the plane of the support beams 62 and 64, each beam incorporates flexible segments which provide axial motion. Thus, for example, beam 62 is mounted at its left hand end 74 (as viewed in FIG. 3) to wall 72 through a first axial spring 76, while at its right hand end 78 the beam 62 is secured to wall 72 through a second axial spring 80. These springs are segments of the beam fabricated by the same process as the remainder of beam 62, with the specific shape and extent of the spring being determined by the first masking step of the process (FIG. 2, step 1). Thus beam 62, including the spring portions 76 and 80, is fabricated using the process illustrated at cross section 2—2' in FIG. 2, and is formed from the material of substrate 70. This material, which preferably is crystalline silicon, is sufficiently resilient to permit the formation of springs, and by careful selection of the shape and thickness of the material in the spring segments they can be made sufficiently stiff to retain the beam 62 in its nominal position while still allowing axial motion of the beam in response to axial forces applied thereto.

In similar manner, beam 64 (as viewed in FIG. 3) is connected at its opposite ends 82 and 84 to opposite parts of the wall 72 through corresponding spring segments 86 and 88, whereby the beam 64 is capable of motion along its longitudinal axis. As illustrated, the longitudinal axis of beam 64 is perpendicular to the axis of beam 62, although they may intersect at some other angle, if desired. It will be understood that since the beams 62 and 64 are interconnected at their intersection 66, axial motion of beam 62 necessarily produces lateral motion in beam 64, and vice versa. The flexibility of the spring segments insures that the tip 22 at the intersection 66 is movable in any direction in the X-Y plane defined by the beams 62 and 64. In addition, the tip 22 is movable in the direction perpendicular to the X-Y plane since both beams can move in that direction.

The recess 68 includes a substantially planar floor surface 90 which is below, and preferably parallel to, the plane of the beams 62, 64 and this floor supports the tip 12 which is self-aligned with the tip 22 carried by the tip support portion of the beams at intersection 66, in the manner described with respect to FIG. 1. The X-shaped support 60 moves tip 22 with respect to this lower tip 12.

The process by which the beams 62 and 64 (as well as beam 24) are formed at their end portions is illustrated in tabular form in FIG. 2 for the cross sections 3—3' and 4—4', taken at the right-hand end portion 78 of beam 62, as viewed in FIG. 3. This illustration is exemplary of the mounting for the remaining ends of the beams 62 and 64. In the region of cross-section 3—3', the beam is formed in the manner described with respect to cross section 2—2' through steps 1 to 6, and accordingly, the features of these steps are similarly numbered in FIG. 2. After the island 45, from which the beam is formed in the region of the cross section 3—3', has been fully isolated from the substrate by the oxidation illustrated in step 6, the dielectric layer 40 is stripped from the top of the island in selected regions (step 7) to expose portions of the top surface 100 of the silicon portion 102 of the island 45. In this case, the portion 102 of the island is the beam 62, and the portion of the top of the beam which is to be exposed for electrical contact purposes is defined by mask No. 3, as described above. After the top of the beam is exposed, a conductive layer of material such as aluminum is deposited and patterned (step 8) to form an electric contact 104, indicated diagrammatically as a rectangular contact in FIG. 3. The contact is defined by mask No. 4 in step 8 of FIG. 2, and as shown in FIG. 3, may extend over part of beam 62 and onto the surface of the substrate material surrounding recess 68 for connecting the beam to external circuits, if desired.

As previously discussed, in step 9 selected portions of the oxide layer 54, as defined by mask No. 5, are isotropically etched away to release selected portions of the beam structure, as was illustrated at cross section 2—2' in FIG. 1. The same release configuration is also illustrated in FIG. 3 at cross section 2—2', where beam 62 is released from the oxide layer so as to extend for free motion across and parallel to the floor 90 of the recess 68. However, in the region of the cross-section 3—3' in FIGS. 2 and 3, the oxide layer 54 is covered by mask No. 5 in step 9 to leave a part of the oxide layer intact beneath the beam. Accordingly, an end portion of beam 62 remains supported by layer 54 adjacent wall 72, with the remainder of the beam extending inwardly from the wall toward the center of the recess 68 in cantilever fashion. The portion of the oxide layer 54 which remains to support the beam is illustrated in top plan view in FIG. 3. This support extends inwardly from the wall 72 to a boundary wall 106 which defines the edge of the oxide layer 54 after the remainder of the beam structure has been released. The location of wall 106, and thus the extent of the support structure for the beam, is defined by mask No. 5 in step 9 of the fabrication process of the present invention.

Beam 62 is electrically insulated from the surrounding substrate material by means of an oxidized segment 110, which preferably is at the end of the beam where it joins the peripheral wall 72. The formation of this oxidized segment is illustrated in steps 1 through 9 of FIG. 2 under the heading "Cross Section 4—4'". Steps 1 through 4 are the same as the steps used in the formation of the remainder of the beam 62, and thus corresponding components are identified by similar numbers. However, after the isotropic recess etch is performed in step 4 to leave the island 102 supported by a necked-down portion 112, mask No. 2 is used in step 5 to strip the dielectric layer 40 and the nitride layer 48 away from island 45, leaving exposed the island portion 102 in the region of segment 110. As illustrated in FIG. 2, the exposed silicon material of island portion 102 is oxidized during the oxidation carried out in step 6 of the process so that step 6 not only forms layer 54, but also oxidizes the exposed portion of the silicon island completely through its cross-section.

The top surface of segment 110 remains exposed during the formation of the electric contact 104 in step 7, and accordingly, this surface is covered by the conductive layer of material which is patterned by mask No. 4 to form the electric contact in step 8, as discussed above with respect to cross-section 3—3'. As illustrated in FIG. 3, the electric contact 104 spans the end portion of beam 62, covering both the oxidized segment 110 and an end portion of the unoxidized beam 62. As discussed above with respect to step 9, mask no. 5 prevents the oxide layer 54 from being removed from the regions of cross-section 3—3' and 4—4' to provide additional support for beam 62 at its junction with wall 72. It will be understood that each of the end portions of beams 62 and 64 are constructed in a similar manner to that illustrated with respect to the end portion 78. Further, it will be understood that if desired, other segments of the beams 62 and 64 can be electrically isolated using the oxidation technique of steps 5 and 6.

Axial motion of each of beams 62 and 64 is produced and is detected, in accordance with one form of the present invention by means of transducers, which preferably are relatively movable capacitive plates formed on the beams. Each transducer includes a first comb-shaped set of plates mounted on the stationary base (or substrate) material surrounding the recess 68 and a second comb-shaped set of relatively movable complementary plates mounted on the beam 62 or 64. Thus, for example, beams 62 incorporates transducers 120 and 121 on opposite sides of intersection 66, while beam 64 incorporates transducers 122 and 124, also on opposite sides of intersection 66, so that the motion and position of tip 22 can be precisely measured and controlled. Transducer 120 is exemplary of the four transducers and includes first and second sets 124 and 125 of stationary capacitive plates located on opposite sides of beam 62. These capacitive plates are fabricated in the same manner as the beams 62 and 64, as described with respect to FIG. 2, and each set preferably includes three or more spaced, parallel, inwardly-extending capacitor plates or "fingers" 126 fixedly mounted to a base 127 in a comb shape. The sets of capacitor plates extend horizontally inwardly into the recess, in cantilever fashion, preferably parallel to the floor 90 thereof, with each of the plates 126 being vertical.

Preferably, the sets 124 and 125 are secured to regions of the surrounding substrate material 70 which are oxidized to provide electrical insulation, as indicated at 132 and 134, in order to electrically isolate the plates from the substrate. The insulated regions 132 and 134 provide paths on which electrical leads (not shown) may be formed for connecting control circuitry to the respective stationary plate sets 124 and 125. For example, these plates ma be connected by means of such electrical leads to suitable voltage sources (not shown) for the application of selected potentials to the capacitor sets for controlling the axial motion of beam 62, and may be connected to suitable sensing circuitry for detecting changes in the electrical charge on the sets 124 and 125 due to externally imposed motion of beam 62.

The transducer 120 also includes movable sets 138 and 139 of capacitive plates, or "fingers" 140 mounted, for example, by means of a support arm 142 to the beam 62. The springs 76 and 80 in beam 62 enable plate sets 138 and 139 and beam 62 to move axially in the directions of arrow 144. The sets 138 and 139 are comb-shaped and include outwardly extending vertical parallel plates 140 which are interdigitated with the inwardly extending plates 126 of sets 124 and 125, respectively, with the interdigitated plates being spaced slightly apart from each other to allow freedom of motion of the beam 62 without contact between the opposed plates. The application of a voltage to sets 124 and 125 produces a potential across the space between the plates of sets 124 and 138 and sets 125 and 139, respectively, to thereby draw the movable sets 138 and 139 into and toward sets 124 and 125, thereby moving the beam 62 to the left, as viewed in FIG. 3.

In similar manner, application of a voltage potential to the stationary plates of the capacitors which make up transducer 121 at the opposite end of beam 62 will tend to move the beam 62 along its longitudinal axis toward the right as viewed in FIG. 3, and by balancing the voltages applied to the two transducers, the beam 62, and thus the tip 22 carried by the beam at intersection 66, can be precisely located along an X axis defined by the axis of beam 62.

Transducers 122 and 123, which are similar to transducer 120, similarly may be energized to move beam 64 along its longitudinal axis in the directions indicated by arrow 146 so that the tip 22 at intersection 66 can be precisely located along a Y-axis defined by beam 64. Proper selection of voltages applied to each of the transducers 120-123 permits precise location of the tip in any direction in the horizontal plane defined by beams 62 and 64.

Any electrical current which flows between tips 22 and 12 also flows through the semiconductive material of beams 62 and 64 to the electrical contact regions 104 on the upper surfaces of the beams, and then through suitable connectors to circuitry and instrumentation such as that illustrated at 36 in FIG. 1.

The device of FIG. 3 may be used, for example, as an acceleration detector where mechanically imposed motion of the substrate due to external forces causes the tip support structure 60 to move slightly with respect to the substrate in accordance with the direction of acceleration of the substrate material. This motion produces a change in the electrical current or electrical potential between tips 12 and 22 which can be detected by the sensing circuitry connected to a contact 104. The sensors then may produce voltages on One or more of the transducers 120-123, which tend to move the tip support structure 60 in a direction to return the tips 12 and 22 to alignment. The voltages required to do this provide a measure of the force applied to the substrate. In this way, vibrations and other mechanical movements in the X-Y plane can be detected and measured.

It is noted that in the embodiment of FIGS. 3 and 4, wherein the beams 62 and 64 are essentially linear, the spacing between the interdigitated plates of the capacitive transducers 120 -123 must be sufficient to permit some lateral motion of the beam to which the movable plates are mounted without producing contact between the adjacent plates. This insures that adequate control of the motion or sensing of the motion will be maintained while still allowing free movement of the tip 22 with respect to tip 12 in any direction in the horizontal plane.

Although not illustrated in FIG. 3, it will be apparent that if (Z-direction) motion of the beams 62 and 64 is required to adjust the gap between tips 12 and 22, or if such motion is to be detected, then one or more pairs of horizontal capacitive plates for example in the form of electrodes (such as electrode 104), may be formed on the beams 62 and 64. Corresponding stationary electrodes may be formed on either the floor 90 or on a structure extending above the beams, with voltages being applied across the electrodes to provide vertical motion (perpendicular to the page) as viewed in FIG. 3. Such vertical, or Z-axis, control may not only be desirable, but since in many cases the beams 62 and 64 tend to bend slightly upwardly upon release from the oxide layers, such Z-axis control may often be required to maintain the desired gap between the ends of tips 12 and 22.

FIG. 4 illustrates the tip support structure 60 of FIG. 3 in a perspective view, illustrating more clearly the locations of the tips 12 and 22 and the spaced relationship between the beams 62 and 64 and the floor 90 of the recess 68. As illustrated, the process of forming the tips 12 and 22 may leave on floor 90 residual upstanding ridges 150 and 152 which are parallel to and spaced beneath the beams 62 and 64.

The movable beam structure of FIG. 3 has application in a wide range of instruments as an actuator and/or as a sensor, yet has the advantage of being fabricated in single crystal silicon in an area only 40 μm by 40 μm. The device is sufficiently stable for use as a scanning tunneling microscope; in one embodiment of the device, it was found that the beams provide a stiffness of 55 N/m in the X and Y directions and 30 N/m in the Z direction. The device will provide reproducible STM images to about 0.1 Angstrom.

As noted above, the formation of the structure illustrated in FIG. 2 at cross section 1—1' results in a generally conical tip if the island 45 is round or square in the region where the tip is to be formed, so that the oxidation occurs substantially equidistant from the tip axis as it consumes the substrate material from all sides. Both the enlarged end portion 39 of beam 24 and the crossed beams at intersection 66 form such conical tips. Furthermore, because the diameter of the enlarged end or of the intersection is larger than the width of the beams the oxidation completely undercuts the beam before the tip region, leaving the self-aligned tips extending between the beam and the underlying substrate. Other shapes of opposed, self-aligned structures can be produced by careful selection of the dimensions of the supporting structure and control of the etching and oxidizing steps of the process. For example, opposed, self-aligned tips in the shape of wedges such as those illustrated at 160 and 162 in FIG. 5 can be fabricated by generating rectangular island structures through the use of suitable masks. When such rectangular structures are oxidized, they are consumed at the same rate in all directions, but the extended length of the island results in elongated wedge portions such as those illustrated at 164 and 166.

If the oxide layer 54 (FIG. 2) is permitted to remain in place between two opposed self-aligned tips, they are not relatively movable. However, in this case the tip structure relies on tunneling through the oxide itself from one tip to the other. Such tunneling is enhanced by providing very sharp tips in very close proximity to one another; for example, with a gap of about 20 Angstroms between the ends of adjacent tips. In the case where the oxide is fully removed to release the island, or beam, from its lower supporting layer, the two opposed tips become movable with respect to one another, and make a number of other applications available, as described above. Tunneling or field emission between the opposed elements can still occur across the gap between the tips, as described above, but in addition the tips can move in response to external stimulus.

During the formation of the intersecting beams 62 and 64 described above with respect to FIGS. 3 and 4, electronic devices such as diodes, MOSFETs, or bipolar transistors may be incorporated in the beams and in the region of the intersection 66. When such a structure is provided at the region of the intersection 66, external electrical contact with the electronic device is provided via the beam structure and/or electrodes fabricated on the surface of the beam, using the same process as illustrated for electrode 104 in FIG. 2. Further, the extent of the undercut oxidation in recess 50 (FIG. 2, step 6) may be controlled to selectively provide direct ohmic electrical connection to, or tunneling connection to, or total isolation from, the substrate, and by controlling the removal of the oxide from under the island, the capacitance between the island and the substrate can be varied. When the island is fully released so that the structure becomes mobile, electronic devices fabricated on the beam may provide the circuitry needed for controlling the vertical spacing between the tips. For example, such circuitry may control the capacitive effect between the beam and the substrate to permit electrostatic control of the beam in the manner provided by the transducers 120–123.

The formation of a MOSFET device along a beam is illustrated in FIG. 6, wherein top surface of the island 170, which is of the same silicon material as its underlying substrate 172, is covered by a gate oxide layer 174 and a polysilicon gate layer 176. The sides of the island are doped in any suitable manner to produce n+ regions 178 and 180 on diametrically opposite sides of the island. The MOSFET device so formed moves with the beam and is electrically isolated from the surrounding support structure by the insulating segment 110 formed by the oxidation step illustrated at cross section 4—4'. Thereafter, an electrical connection can be made to the gate region 176 by means of an evaporated or sputtered metal film, such as an aluminum film, extending from the gate region along the beam and across the oxidized region 110 to a suitable electrical contact pad, in the manner of the electrical contact 104 illustrated in FIG. 2 at cross section 4—4', and shown in FIGS. 3 and 4. Other electronic devices can also be provided in the beams in the same manner as the MOSFET device described above, with appropriate electrical connections being made as required.

Although the invention has been illustrated in terms of providing vertical self-aligned conical or wedge-like tips, it will be understood that horizontal self-aligned tips may be formed utilizing the same general techniques. A method for forming horizontal self-aligned dual wedge-like tips is illustrated in FIGS. 7, 8 and 9. This technique is based on the fact that the oxidation of silicon can take place through very small "windows" in a nitride mask layer and that the thickness of the oxide will be dependent upon the width of the window. Thus, if the size of a window opening on the top of a narrow silicon island is properly selected, the extent to which the oxide growing down from the top of the island approaches the oxide growing upwardly beneath the island, in the manner of the oxide formation in the recesses 50 of FIG. 2, step 5, can be tailored to provide horizontal self-aligned opposed wedge-shaped tips having selected gaps between adjacent tips.

To form horizontal self-aligned wedges, a beam-shaped island 190 is fabricated from a wafer having a silicon substrate 192, in accordance with the process illustrated in steps 1 through 4 of FIG. 2. The island is formed with a thin layer 194 of silicon oxide on its top surface (see FIG. 7) covered by a mask layer 196 of silicon nitride which layers are similar to layers 40 and 48 in FIG. 2. By suitable masking of the island 190, submicron windows 198 and 200 are etched through the silicon oxide layer 194 and the nitride layer 196 on top of the island 190 to expose the top surface 202 of the silicon substrate material 192. Thereafter, the surface of the wafer is oxidized, with the oxide growing downwardly through the windows 198 and 200 and growing upwardly beneath the lower edge 203 of mask layer 196 into the top portion of the island by way of the recesses 204 and 205, which correspond to the recess 50 of FIG. 2. The growth of the oxide is indicated by the dotted arrows 206 (see FIG. 8), and the amount of oxide formed depends upon the width of the submicron window, the oxidation time, the height of the island, the depth of the recess etch, and the like. The oxidation causes the silicon island 190 to neck down not only in the undercut regions 204 and 205, but in the windows 198 and 200 to produce the desired degree of isolation between adjacent segments of the island. The oxidation process in the silicon material produces axially self-aligned tips in each window segment, in the form of wedges, with axes of tips being parallel to the substrate, as illustrated in FIG. 9. The wedges correspond to segments 207, 208 and 209 of the island 190, it being understood that the segments in FIG. 9 initially are surrounded by oxide which is then selectively removed to release selected wedges for relative motion with respect to each other and/or to the substrate.

As illustrated in FIGS. 8 and 9, the axially horizontal wedges 207, 208 and 208, 209 fabricated as described above will be spaced apart by gaps 210 and 212, respectively. The distance between the tips depends upon the width of the window. Although the oxidation usually proceeds at substantially the same rate on all exposed surfaces, this is not the case when the window size approaches the deep submicron regime; i.e., when the window opening is in the range of 0.1-0.2 micron. Thus, the oxide thickness grown in a window falls off as the window opening is reduced from about 1 micron to the submicron range, and this reduction in rate enables this particular process to work.

It will be noted that the opening of a "window" in the top surface of the nitride can be extended over the sides of the island by over-etching the nitride so that a part of the nitride side wall is removed from the silicon island in the vicinity of the top surface opening, as indicated by the dotted lines 214 in FIG. 7. This removal of the nitride mask from the side walls of the island allows oxidation to reach the island not only from the top surface and from the bottom recesses, but from a part or all of the side wall through the area 214. In this way, instead of the wedges of FIG. 9, self-aligned conical tips 216, 217 can be produced as illustrated in FIGS. 22 and 23.

Figure 22A:
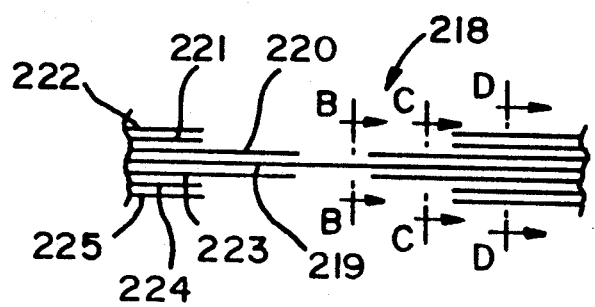
FIGS. 22(A-D) illustrate, in tabular form, a process for fabricating horizontal self-aligned opposed tips.
Figure 23:
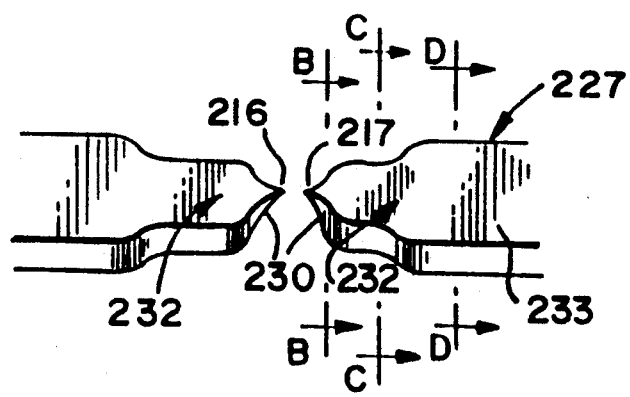
FIG. 23 is a perspective view of a pair of opposed tips formed in accordance with the method of FIG. 22.

The key to forming lateral tipis through deep submicron windows on the top of an island, and through windows which extend over the lateral edges of the island, is the provision of a top surface masking nitride layer (under which is depsited a stress-relief oxide film) and the further provision fo a sidewall nitride masking layer. Thus, control of the shape of horizontal self-aligned tips can be obtained through the use of the submicron window technique or through the use of lithographic masks 42 (FIG. 2 and FIG. 22A) to produce the islands extending above the silicon substrate. Instead of forming rectangular beam-like islands, such as that illustrated in FIG. 7, it is possible to create, through electron beam lithography such as that illustrated in top plan view in FIG. 22A, for example, different shapes which produce different patterns of oxidation. Thus, the mask which forms the upstanding island can be square, round, rectangular, tapered, may be provided with curved ends or sides, or may be stepped, as in FIG. 22A, all of which result in different patterns of oxidation and thus produce correspondingly distinct tip and beam shapes in horizontal self-alignment.

Where electron beam lithography is used to define the islands, as generally illustrated at 218 in FIG. 22A, the thinnest lines that can be formed are made by "zero-width" traces which are a single pixel in width; that is, the line will be approximately the same size as the electron beam spot diameter. Since such electron beams move in steps rather than continuously, they tend to produce a series of circular spots, or pixels. Zero width lines may be drawn by making two or three traces along the same line. Although nominally the individual pixels formed by the beam during each trace will land exactly in the same place, very small errors in beam placement from trace to trace provide a random offset to provide a straight line, such as the line 219, sufficient to expose a given resist layer to provide the desired line width. Multiple and side-by-side passes of the electron beam produce lines 220-225, as illustrated in FIG. 22A to provide the desired width and shape of the exposed area in the resist, and thus define the shape of the island formed during the fabrication process described herein. Various other techniques for lithographically defining the shape of the island will be apparent.

Figure 22B:
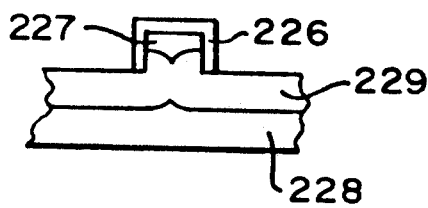
Figure 22C:
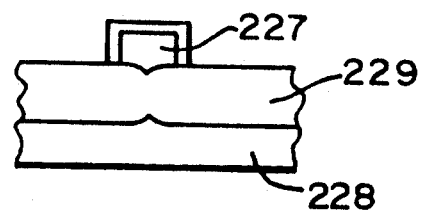
Figure 22D:
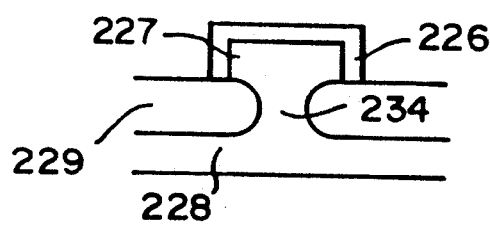

The masking and oxidation steps described above result in the cross-sectional structures illustrated in FIGS. 22B, 22C and 22D at cross-sectional regions B, C and D, of FIG. 22A, respectively. Thus, a nitride mask 226 in the region of the single etched line 219 results in an isolated beam portion 227 spaced above a substrate 228 and separated by oxide 229 as viewed in cross-section in FIG. 22B. The single line also produces laterally narrowed regions 230 (in top plan view) as illustrated in FIG. 23, which result in the formation of opposed tips 216 and 217 aligned along line 219.

The etch lines 220 and 223 (FIG. 22A) produce a laterally wider region in beam 227, as illustrated at 232 at cross-section C—C in FIG. 23, with the beam being isolated from the substrate in the manner illustrated in FIG. 22C. Similarly, etch lines 221, 222, 224 and 225 result in a still wider region 233 in beam 227, again as illustrated at cross-section D—D in FIG. 23. This beam is not isolated from substrate 228, in the illustrated embodiment, at cross-section D—D illustrated in FIG. 22D, but the beam 227 is supported on the substrate 228 by a pedestal region 234 to thereby support the horizontally-spaced, laterally aligned tips in a cantilever fashion.

The horizontal self-aligned tips of FIGS. 9 and 23 are important, for they provide a convenient way to provide very small capacitors integrated into a silicon wafer.

It is also possible, in accordance with the present invention, to create structures wherein multiple self-aligned tip pairs are fabricated in vertical alignment through the height of an island. An example of the method of fabricating such a structure is illustrated in FIG. 10, steps 1 through 7. Step 1 illustrates a standard ISLO structure formed in accordance with the process of steps 1, 2 and 3 of FIG. 2. This structure includes a silicon substrate 235 formed to include an upstanding island portion 236 on which is located a first oxide layer 237 (Ox-1), a first nitride layer 238 (Ni-1), and a second oxide layer 239 (Ox-2). As illustrated, a second nitride layer 240 (Ni-2) extends completely over the top and sides of the island.

In step 2, the nitride layer 240 is first removed from the horizontal surfaces by RIE, leaving the nitride layer 240 on the side walls. The RIE etching process is continued, with the oxide layer 239 protecting the nitride layer 238 while a portion of the nitride layer 240 on the side wall is removed. This "over-etching" leaves only the partial side wall nitride segments 241 and 242 (Ni-2).

The structure is next planarized, as illustrated in step 3 of FIG. 10, through the use, for example, of a polyimide resin or a spin-on-glass (SOG) layer, followed by an etch back to reveal a top portion of the island. Thus, as illustrated in step 3, the island 236 extends above an SOG layer 243 which lies on the horizontal top surface of the substrate 235 but which leaves the upper part of the island 236 and its covering layers 237-239 exposed.

The next step, as illustrated in step 4 in FIG. 10, is to deposit an LPCVD nitride layer 244 (Ni-3) over the entire structure. LPCVD nitride is a high temperature material which is used with spin-on-glass; however, if a polyimide resin is used to planarize the structure, a low temperature nitride would be used. Thereafter, as illustrated in step 5, an RIE process is performed, as was done in step 2, to remove the nitride 244 from the horizontal surfaces while leaving the side walls covered by segments 245 and 246. The SOG layer 243 is then stripped, leaving the side walls of the island 236 covered by nitride segments 241 and 242 (Ni-2) from step 2 and segments 245 and 246 (Ni-3) from step 5. The nitride layers 245 and 246 cooperate with the nitride layer 238 to form a continuous oxidation mask across the top of the island.

As illustrated in step 6, a recess etch is then performed to undercut the island at both the upper and lower ends of the side wall mask segments 241 and 242, thereby producing the recesses 247 and 248 on opposite sides of the island above segments 241 and 242, and providing recesses 249 and 250 below segments 241 and 242.

In step 7, the structure is oxidized, with the oxidation 251 and 252 undercutting portions of the island 236 in each of the recesses 247, 248 and 249, 250 in the manner described with reference to FIG. 2, step 6. Thereafter, the sidewall and top dielectric layers 237, 238, 239, 241, 2 34, 245 and 246 are removed, while leaving the isolation oxides 251 and 252, to produce the segmented island structure illustrated. The oxide layers may then be removed, leaving the island 236 separated into two parts, indicated at 236' and 236" in step 8. This results in a first pair of self-aligned, opposed conical or wedge-like tips 252 between the island segments 236' and 236", and a second set of opposed conical or wedge-like tips 254 between island segment 236' and the substrate 235. It will be evident that the same general process as that illustrated in FIG. 2 can be used to produce beam structures to support each of the island segments 236' and 236", and that additional sets of vertically self-aligned tips can be fabricated using the technique of FIG. 10. Furthermore, an upwardly-facing tip 255 can be provided, as illustrated in step 8A of FIG. 10, by a modification of the process of FIG. 10. In this alternative, after step 7, the topmost island segment 236" is removed, as by an anisotropic silicon etch, while the isolating oxide layers 251 and 252 are still in place. Thereafter, an isotropic oxide etch strips the oxide layers 251 and 252 for release of island 236', as illustrated in FIG. 10, step 8A.

A second procedure for fabricating upwardly-facing tips is illustrated in FIG. 11, which is similar to the process of FIG. 10. Layers common to the steps of FIGS. 10 and 11 are similarly numbered. Five steps are involved in this second method of fabricating an upwardly-facing tip. Step 1 is similar to step 1 of FIG. 10, providing a silicon island 236 formed from a substrate 235, the island having a layered dielectric on its top surface consisting of a first oxide, a nitride, a second oxide, and a second nitride layer illustrated at 237, 238, 239 and 240, respectively. The nitride layer 240 covers the side wall of the island 22, as illustrated in step 1. In step 2, an RIE step is used to remove most of the Ni-2 layer 240 on top of the island and on the surface of the silicon substrate 235. The Ni-2 layer is overetched so that the side wall portion, illustrated at 241 and 242 in FIG. 2, is eroded to a point just below the Ni-1 layer 238, thereby exposing the upper portion of the oxide layer 237 in a gap between the Ni-1 and the Ni-2 layers 238 and 241, 242.

In step 3 of FIG. 11, a recess etch is performed (as in step 6 of FIG. 10) on the surface of substrate 235 to produce a recess 256 which undercuts island 236.. During this recess etching step, the oxide layer 239 protects the top of the silicon island 236. Thereafter, as illustrated in step 4, the island and the surface of substrate 235 are oxidized causing the Ox-1 layer 237 to grow in the manner illustrated at 257. Similarly, oxidation takes place at recess 256 to produce the oxide layer 258 on the surface of the substrate 235 and to undercut island 236 to isolate the island from the substrate. This oxidation of the silicon at both the top surface and the bottom of the island 22 produces the downwardly facing opposed tips 254, as previously described with respect to step 7 of FIG. 10, but in addition forms an upwardly-facing tip 259 as illustrated in step 4 of FIG. 11. The oxide and the masking nitride layers are then removed in step 5 of FIG. 11, leaving the substrate 235 and the released island portion 236', which may be in the form of a beam with a self-aligned opposed tip pair 254 and with an upwardly-facing tip 259.

Figure 12:
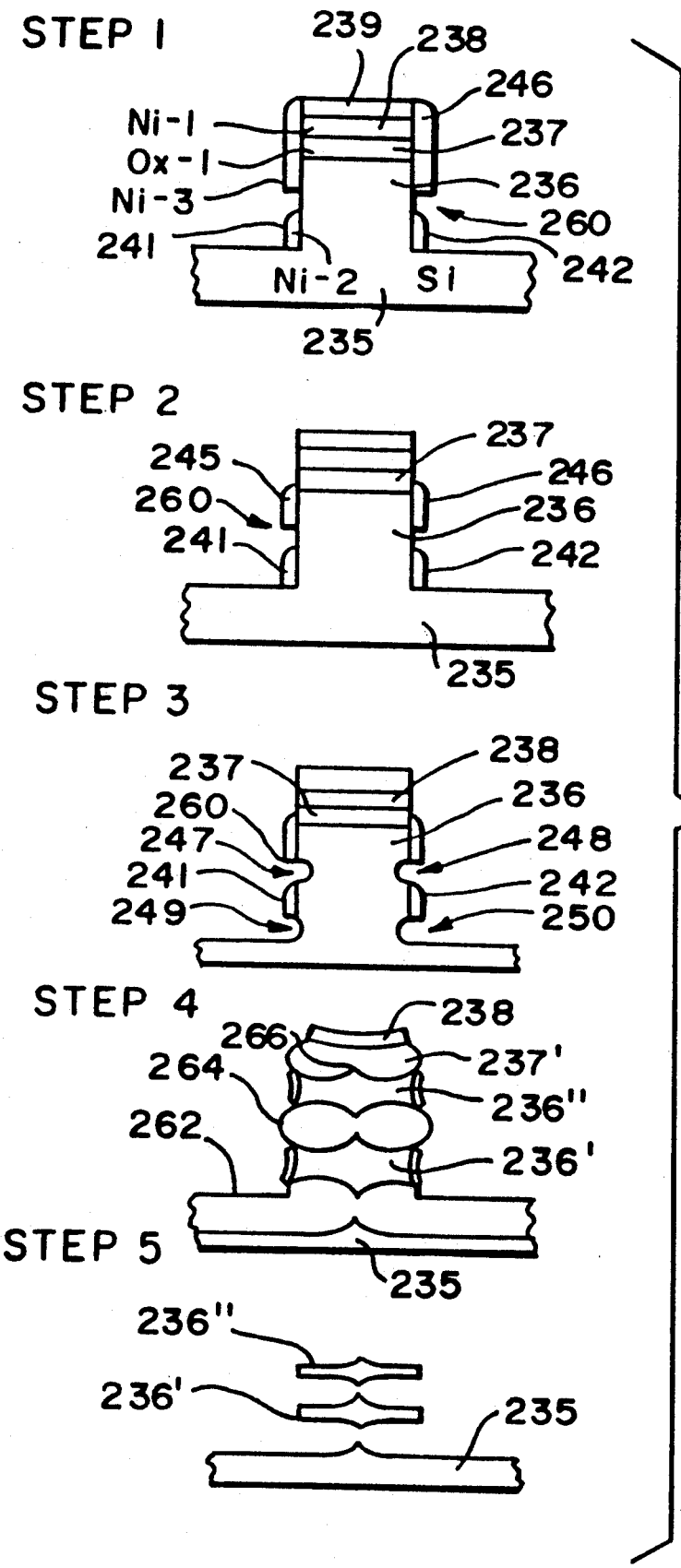
FIG. 12 illustrates, in tabular form, another process for fabricating multiple vertically stacked tips, wherein the uppermost tip is a single tip.

FIG. 12 illustrates a fabrication process which combines the features of FIGS. 10 and 11 to provide multiple, vertically stacked, self-aligned tips. Step 1 of this process is the same as step 5 of the FIG. 10 process, and similar elements are similarly numbered. It should be noted that, as with the FIG. 10 process, the structure illustrated in step 1 may include a plurality of vertically-spaced openings such as the aperture 260 between the lower sidewall nitride layer 241, 242 and the upper sidewall nitride layer 245, 246 to provide added vertically aligned tip segments in island 236. These additional apertures may be formed by repeating steps 3, 4 and 5 of the process of FIG. 10 to build sidewall segments up the height of island 236.

Referring to step 2 of FIG. 12, after the top sidewall coating 245, 246 is provided, it is etched back to expose the top dielectric stack, including layers 237, 238 and 239, in the manner illustrated in step 2 of FIG. 11, leaving the sidewalls of at least the upper part of island 236 and a part of oxide-1 layer 237 covered by nitride layers 245, 246. Thereafter, the etching step illustrated in step 6 of FIG. 10 is performed, resulting in recesses 247 and 248 (see step 3 of FIG. 12) in the aperture 260 and recesses 249 and 250 beneath layers 241, 242, thereby undercutting island 236 in two locations (and in additional locations if the sidewall nitride layer is further segmented, as discussed above).

The island is oxidized, as illustrated in step 4 of FIG. 12, to thereby isolate segments 236' and 236" by oxide layers 262 and 264. The oxidation step also further oxidizes layer 237 (oxide-1) as illustrated at 237' and thereby oxidizes the silicon island at its interface with layer 237. This oxidation of the top surface of island 236 produces an upwardly-facing tip 266 at the same time that the oxidation process undercuts the island in the location of recesses 247, 248 and 249, 250, to isolate island segments 236' and 236" in the manner described with respect to FIG. 10. The oxide may then be removed to produce separate segments 236' and 236", as shown in step 4 of FIG. 12, thereby producing an odd number of vertical self-aligned tips which may be formed as a part of corresponding cantilever beams, for example, in the manner previously described.

Another process for forming multiple tips stacked in vertical alignment is illustrated in FIG. 13, to which reference is now made. In this process, two (or more) independent selective oxidation steps are used in conjunction with two (or more) oxide/nitride/oxide (ONO) stacks separated by polysilicon films. The process begins by growing and depositing two (for example) ONO stacks, as illustrated in step 1 of FIG. 13. The first ONO stack 270 consists of layers OX-1, Ni-1 and OX-2, and is similar to the dielectric stack as shown in FIG. 12, step 1. A polysilicon film 272 is formed on the top of stack 270, and, where two pairs of vertically self-aligned tips are to be formed, a second ONO stack 274 is formed, consisting of layers OX-3, Ni-4 and OX-4. Thereafter, the sidewalls of the island are covered by a nitride layer Ni-5, as shown at 276, 278 in step 2 of FIG. 13, formed by depositing a nitride layer over the entire island and then etching it away from the horizontal surface.

As illustrated in step 3 of FIG. 13, the structure produced by step 2 is recess etched in the manner described with respect to step 6 of FIG. 10, to produce recesses 280 and 282 undercutting the island 236. The exposed silicon is oxidized, as illustrated at 284 in step 4 of FIG. 13, to isolate the island segment 236' and to form tip pair 285, and then the dielectric ONO stack 274, the sidewall layers 276, 278 and the oxide 284 on the surface of substrate 235 are removed, using a combination of isotropic and anisotropic etching steps. This etching step stops at the polysilicon film 272, as shown in step 5, and also at the surface of silicon substrate 235, leaving the upper island segment 236', the polysilicon film 272, and ONO stack 270 supported by the oxide 284.

A second vertical self-aligned tip pair is then formed by means of an RIE trench etching process, similar to that in step 2 of FIG. 2, to extend the height of island 236 by forming a lower island portion 290 in the substrate 235, as illustrated in step 6 of FIG. 13. This consumes the polysilicon layer 272, but ONO stack 270 remains as a self-aligned mask for the RIE etch. This is followed, in step 7, by the formation of sidewall nitride spacer layers 292, 294 in the manner described with respect to step 2, which in turn is followed by a recess etch to form the recesses 296, 298. The exposed silicon is oxidized, as illustrated in step 8, to produce oxide layer 300 on the surface of substrate 235 and in the recesses 296, 298 to undercut the island portion 290, thereby isolating an island segment 290'. At the same time, a second pair of opposed tips is formed, as at 302, between island segment 290' and substrate 235. The sidewall spacer 292, 294, the ONO layer 270, and the oxide 284 and 300 can then be removed to free the island segments 236' and 290', as illustrated in step 9 of FIG. 13.

As illustrated by the steps of FIG. 13, two sets of opposed tips can be provided by the use of two ONO stacks formed on the island 236. Additional pairs of tips can be produced by adding additional ONO stacks, and repeating the above-described process of increasing the island height (as by the described trench etch process), adding sidewall spacer layers, recess etching, etc.

By combining the process of FIG. 13 with that of FIG. 11, an odd number of tips can be produced, with the odd tip protruding upwardly as illustrated in FIG. 13A. The process of FIG. 13A is the same as that of FIG. 13 with the exception of modified steps 7A, 8A and 9A, shown in this figure. The upward tip is formed by erosion of the sidewall nitride layer 292, 294 of FIG. 13, as shown in step 7A of FIG. 13A, to expose the OX-1 layer of ONO stack 270, as shown by 292' and 294'. This provides apertures 295, 295' through which the top of segment 236' can be oxidized to form an upwardly facing tip 297 during the oxidation in step 8A which forms the lowermost tip pair 302.

In each of the foregoing fabrication processes, it will be noted that an upwardly protruding tip can be generated from any process which produces a tip pair, through selective removal of a corresponding downwardly-facing tip, or by selective exposure of the top of an island to the oxidation process. Such upwardly facing tips can be used for a variety of purposes, including erosion of the sidewall nitride for the production of upwardly facing tips in the processes of FIGS. 11, 12 (step 2) and 13A (step 7A) requires careful timing of the erosion to insure that the correct amount of underlying material is exposed.

The techniques described above permit the formation of lateral and vertical self-aligned conical and wedge-like tips, permit the formation of vertically stacked self-aligned tips supported on beams or other structures, permit the formation of multiple tip pairs spaced along beams and at the intersections of beams, and permit the formation of upwardly-facing tips located on the tops of beams. Such a variety of structures permits a wide range of uses for the movable tip pairs of the present invention.

Although the use of an X-shaped tip support at the intersection of linear beams constructed in accordance with FIGS. 1 and 3 has worked satisfactorily, it will be seen that lateral motion of either beam is constrained by the spacing between the plates of the capacitors forming transducers 120, 122, 124 and 126. Thus, for example, when beam 62 is moved in a longitudinal direction by selective energization of transducers 120 and 122, beam 64 is subjected to lateral motion along the same axis by virtue of the interconnection of the beams at 66. This lateral motion is limited by the spacing between adjacent interdigitated plates in capacitive transducers 124 and 126.

The foregoing limitation can be overcome by the provision of offset support beams which are shaped s that the motion of the intersection of the beams in the (X-Y) plane of the beams is produced by bending moments in both of the beams, rather than longitudinal motion in one and lateral motion in the other. This construction avoids the need for interdigitated capacitor plates, allowing a freer motion of the intersection which supports the tip in the X-Y plane. This alternative construction is illustrated in FIG. 14, to which reference is now made.

In the embodiment of FIG. 14, a movable tip structure generally indicated at 360 incorporates a pair of crossed, offset beams 362 and 364 mounted in a recess 366 formed in a substrate 368. The beams 362 and 364 are formed in the manner of the linear beams 62 and 64 illustrated in FIGS. 3 and 4, and thus extend generally across the recess 366, parallel to and spaced from the recess floor 370. The beams 362 and 364 cross each other and are joined at intersection 372 to form an X-shaped support for an upper tip (not shown) of a self-aligned tip pair such as the conical tips 22 and 12 illustrated in FIGS. 3 and 4. The offset beams lie in a horizontal X-Y plane and are so shaped that the upper tip mounted on the X-shaped support 372 can be moved in any direction in the X-Y plane of the beams, and can be moved in the Z-direction, as well. This three-dimensional motion can be produced either by transducers such as capacitive plates mounted on the movable beams and on adjacent walls of the recess 366, or by externally-applied mechanical forces on the substrate, in which case the transducers can be used to monitor the relative movement of these beams as discussed above with respect to the embodiment of FIGS. 3 and 4, for example.

In the movable tip structure 360 of FIG. 14, the beams 362 and 364 differ from the beams of FIGS. 3 and 4 in that they do not include axial springs. Instead, the beams include offset, generally J-shaped sections which act as lateral springs to take advantage of lateral bending moments to permit motion in the X-Y plane. Thus, beam 362 is connected at its left-hand end 374, as viewed in FIG. 14, to the vertical wall 376 which forms the periphery of recess 366. The end segment 374 is parallel to an X-axis of the tip structure 360, and is connected through a laterally-extending segment 378 to a second axial segment 380. Segment 380 is connected to a second lateral segment 382. Segments 378 and 380 extend in opposite directions, segment 378 leading away from the intersection 372 toward the peripheral wall 376, and segment 382 leading toward the intersection 372, thereby forming a generally J-shaped beam section. The segment 382 is connected to the left hand end (as viewed in FIG. 14) of an axially extending tip support section 384 which forms part of the X-shaped tip support 372. The remainder of beam 362 is similar to the foregoing, and includes an axial segment 386 mounted on wall 376 at the end of beam 362 opposite to end segment 374. The beam further includes a lateral segment 388, an axial segment 390, and a lateral segment 392 which is connected to the right-hand end of tip support section 384. Thus, the beam 362 extends generally parallel to the X-axis of the tip support structure 360, but includes two J-shaped offset sections to provide an offset beam structure. This offset structure provides flexibility in the X-axis direction of motion of the tip at intersection 372 primarily through bending motion of the laterally-extending segments 378, 382, 388 and 392. Y-axis flexibility is provided by bending motion in axially-extending segments 374, 380, 386 and 390.

Control of the motion of beam 362, as well as detection of motion, is provided by four transducers 400, 401, 402 and 403, transducers 400 and 402 being located on axially-extending segments 380 and 390, respectively, of beam 362 and transducers 401 and 403 being located on laterally-extending segments 382 and 392, respectively. The energization of transducers 401 and 403 tends to move the intersection of tip support 372 along the X-axis of the device, while the energization of transducers 400 and 402 tends to move tip support 372 along the Y-axis.

In similar manner, Y-axis motion of the tip support 372 is provided by the Y-axis beam 364, which is connected at its opposite ends to the wall 376 on opposite sides of recess 366. The beam 364 includes, at its upper end (as viewed in FIG. 14), an axial segment 410, a lateral segment 412, an axial segment 414, and a lateral segment 416 connected to form a first J-shaped section. This section is connected to the upper end of a tip support segment 418 which forms the Y-axis portion of tip support 372. The opposite end of beam 364 similarly includes an axial segment 420, a lateral segment 422, an axial segment 424, and a lateral segment 426 forming a second J-shaped section of beam 364 and connected to the bottom end of tip support segment 418. Beam 364 thus has the same offset structure as X-axis beam 362.

Beam 364 includes four transducers 430, 431, 432 and 433 connected along the beam to provide Y-axis as well as X-axis motion of the beam. Transducers 431 and 433 are connected to segments 416 and 426 to move the Y segment 418 axially along the Y-axis, while transducers 430 and 432 are connected to segments 414 and 424 to move the beam 364, and thus the tip support section 372 laterally, along the X-axis.

Preferably, the transducers 400-403 and 430-433 are capacitors, each having one plate mounted on its corresponding beam segment for motion with the beam, and its opposite plate mounted on an adjacent wall portion of recess 366. The wall-mounted plates are stationary, and each is electrically connected to suitable control circuitry (not shown), as by means of electrical leads such as leads 440-443 connected to transducers 400-403, respectively, and leads 444-447 connected to transducers 430-433, respectively.

By the application of suitable voltages to selected plates of the capacitors, the motion of tip support 372 can be precisely controlled in the X-Y plane. Conversely, relative motion of the tip support with respect to the substrate caused, for example, by an external force applied to the substrate, can be accurately detected by the transducers.

Beams 362 and 364 are connected at opposite ends to corresponding electrical conductors, such as conductors 450 and 451 for beam 362 and conductors 452 and 453 for beam 364, to allow the beam to be connected to suitable control circuitry (not shown). These conductors are formed on the top surface of substrate 368 in the manner described for the conductors 132, 134 in the device of FIG. 4. In addition, control circuitry can also be formed integrally with the substrate, or wafer, 368 using conventional integrated circuit technology.

Although not illustrated in FIG. 14, it will be understood that beams 362 and 364 preferably ar integrally joined to the wall 376 of substrate 368, and may be supported by an oxide layer such as the layer 54 illustrated in FIGS. 3 and 4. Alternatively, the beams may be supported on pedestals such as the oxide base 54 without being connected to the side wall of the recess. Furthermore, the beams may be insulated from the surrounding substrate by providing an oxide segment at each end of the beam, or at intermediate selected locations on the beam, in the manner described above with respect to oxide segments 11 in the device of FIGS. 3 and 4, with electrodes being provided where needed to produce desired electrical connections across the insulating segments.

As noted above, beam 362 includes the X-axis portion 384 of the tip support 372 and thus, although the beam has offset portions, it may be referred to as the X-axis beam. In similar manner, the beam 364, although having offset portions, includes the Y-axis portion 418 of the tip support 372 and may be referred to as the Y-axis beam. Transducers 401 and 403, when energized, tend to move the beam segment 384 in the X-axis direction, this motion being accommodated by the generally J-shaped section formed by segments 378, 380 and 382 and by the generally J-shaped section formed by segments 388, 390 and 392 located on opposite sides of the tip support.

These segments tend to hold the tip at a center location, but the flexing or bending motion of these two J-shaped sections of beam 362 allow the tip support 372 to be moved along the X-axis of the device. Lateral motion of the segment 384 can be controlled, in part, by transducers 400 and 402 which cause flexing motion in the beam segments.

In similar manner, axial motion of beam segment 418 along the Y-axis of the device can be accomplished by means of transducers 431 and 433 which cause flexing or bending motions in corresponding J-shaped sections consisting of segments 412, 414 and 416 for transducer 431 and segments 422, 424 and 426 for transducer 433. Lateral motion of segment 418 is controlled by means of transducers 430 and 432.

All of the transducers work together to provide very precise control of the location of the tip carried by tip support portion 372, with the degree of motion of the tip being limited only by the gaps in the capacitive plates of the several transducers. It will be noted that the moving parts of the capacitive plates which make up the several transducers preferably consist of conductive segments of the beams 362 and 364 or coatings carried by the beams. These segments may be isolated by nonconductive oxide sections of the beams, with electrodes being provided on the beams to interconnect the movable capacitive plate sections to suitable electronic circuitry. Preferably, however, the plates which consist of the beams 362 and 364 are at the same potential, with control voltages being applied to the stationary plates by way of their corresponding connections.

In one form of the invention, the stationary plates connected to the wall portion of the substrate for each of the transducers are made relatively long with respect to the conductive portions of the movable beams which form the opposing capacitive plates for the corresponding transducers. Accordingly, as the beams are moved either mechanically or by the application of potentials to selected capacitors, the movable plate always remains within the boundary of the stationary plate to provide a full range of motion or detection of motion.

One advantage of the interdigitated finger-like transducer structure of the device of FIGS. 3 and 4 is that the electrostatic force provided by such a structure remains constant throughout the range of motion of the device. With the parallel plates of the transducers illustrated in FIG. 14, however, the force applied by the energized capacitors varies with the motion of the beam. Since the force is inversely proportional to the square of the gap between the plates, it increases as the gap gets smaller. This is favorable for the construction illustrated in FIG. 14, since the changing force exerted by the capacitor matches the changing resistance to motion of the J-shaped beam segments which provide the spring action for the beam. The more the springs are moved out of their normal shape, the greater the force that is required to move the beam. However, this requirement is matched by the increased force provided by the capacitors, so the structure of FIG. 14 is advantageous.

Although the structures illustrated in the foregoing embodiments utilize either a single beam or pair of beams to provide relative motion between adjacent tip pairs, other structures are possible utilizing the techniques of the invention. For example, multiple beams may be provided to support multiple tip pairs, in the manner illustrated in FIG. 15 by the beam structure generally indicated at 460. In this example, an X-axis beam 462 may be of any desired length, and intersects a plurality of Y-axis beams such as the beams 464, 466, 468 and 470. The X and Y axis beams are interconnected at their respective intersections 472, 474, 476 and 478, respectively, and a pair of vertical, opposed, self-aligned conical or wedge-shaped tips may be formed at each of these intersections using the fabrication method described above with respect to FIG. 2, for example.

Although the description has been directed to the formation of silicon beams with silicon oxide providing electrically insulating portions near the ends of the beams, FIG. 15 illustrates that such oxide portions may be formed at any desired location along the beam. Thus, for example, the beam includes a silicon oxide segment 480 at the right hand end of the beam 462 where the beam is connected to the wall of the recess in which it is formed or where it is mounted on an oxide base (not shown), or both. An electrically conductive electrode 482 is shown as being formed over the oxide segment 480 and extending onto an insulating oxide portion 484 on the surrounding substrate illustrated at 486, in the manner described hereinabove with respect to FIGS. 3 and 4.

The beam 462 incorporates a first spring portion 488 which is similar to the springs illustrated in FIG. 3, and also may include additional spring segments such as those illustrated at 490 and 492 at different locations along the length of the beam. These additional springs may be provided to produce a desired freedom of axial motion in the beam, for example, and are here illustrated as being of different materials to demonstrate the versatility of the method of the present invention. Thus, for example, the spring 490 may be formed from silicon oxide during the same process by which the remainder of the beam is formed. Spring segment 492 may, for example, be formed of silicon nitride to provide desired mechanical and electrical properties in the beam 462. Silicon oxide ($SiO_2$) may also be used to form electrically insulating segments of the beam such as the segment 494, and silicon nitride ($Si_3N_4$) may similarly be used to form segments such as segment 496 of the beam.

The process for forming the various oxide and nitride segments of the beam 462 are illustrated in tabular form in FIG. 16, to which reference is now made. The process of FIG. 16 includes 12 steps involving seven masks which produce the various structures illustrated at the six cross sectional regions illustrated in FIG. 15 at 1—1', 2—2', 3—3', 4—4', 5—5', and 6—6'. Steps 1 through 4 of the process of making the device of FIG. 15 are illustrated in FIG. 2 and are identical to steps 1 through 4 of that figure for all six cross sectional regions. Thus, for the first four steps, a silicon wafer is coated with a dielectric layer 40 including silicon nitride which is then patterned by mask 1 to provide a masking layer 42. In step 2 the mask pattern is transferred by means of reactive ion etching of the dielectric layer 40 to the underlying silicon 18, forming island (or mesa) 45. At step 3, the silicon wafer is coated with a second dielectric layer, including silicon nitride which is anisotropically etched back, leaving only the side wall 48 and the top dielectric layer 40 intact. In step 4, isotropic recess etching is performed to etch back the exposed silicon to produce recesses 50 around the island, leaving the island 45 with its side walls covered by silicon nitride layer 48 and its top surface covered by dielectric layer 40.

Turning now to FIG. 16, wherein elements common to FIG. 2 are similarly numbered, in step 5, selected portions of the dielectric layer 40 are stripped, using mask No. 2, leaving the island 45 at cross sectional regions 1—1', 2—2', 3—3' and 5—5' intact, but removing the oxide and nitride layers from the island 45 at cross sectional regions 4—4' and 6—6'. These latter two regions are stripped in order to provide for electrical isolation of adjacent parts of the beam 462.

In step 6 of FIG. 16, the top surface 46 of the wafer 18 is oxidized to produce the oxide layer 54 described With respect to FIG. 2. This oxide layer extends into the recess 50 and thus laterally under the island 45 at each of the cross sections of FIG. 16 so as to isolate the silicon island 45 from the substrate 18. At the same time, the island 45 is fully oxidized at cross-sections 4—4' and 6—6', where it was unprotected.

In accordance with the process of FIG. 16, in step 6a, a silicon nitride layer is deposited over the entire surface and is and then an isotropically etched back, leaving only the side wall portion intact, as illustrated at cross section 4—4' and at cross section 6—6'. This provides a side wall layer 500 at these cross-sections which is similar to layer 48 at the other cross-sections. In step 7, through the use of mask No. 3, selected portions of the dielectric layer 40 are stripped for electrical contact purposes, as illustrated at cross section 3—3', leaving the upper surface 502 of the silicon island 45 exposed.

A conductive layer of material is then deposited through mask No. 4 (step 8) to produce the electric contacts 482 illustrated in FIG. 15 in the regions of cross sections 3—3' and 4—4'. It is noted that the electrical contact is formed on the upper surface 502 at cross-section 3—3' so that it is electrically connected to the silicon material of the island 45, while at cross section 4—4' the contact lies on the top surface of the oxidized segment of island 45. This allows electrical connections to be made to segments of the beam structure which are electrically isolated.

At step 9, selected portions of the field oxide layer 54 are isotropically etched away to release the island 45 under the control of mask No. 5. Thus, the oxide is etched away in regions 504, 506, 508 and 510 to release the island 45 from substrate 18 at cross sections 1—1', 2—2', 5—5' and 6—6', thereby forming the beam 462. It is noted that the exposed oxide of island 45 at cross section 6—6' is also etched away during the removal of portions of layer 54, leaving only the nitride side walls 500 at that location. These side walls are sufficiently thick and flexible to support the beam 462. Mask No. 5 leaves the dielectric layer 40 intact in cross sections 1—1', 2—2' and 5—5', while electrode 482 protects the oxide at cross sections 3—3' and 4—4'.

In step 10 of FIG. 16, dielectric layers including silicon nitride are deposited and then, through the use of mask No. 6, are etched back to leave a masking nitride layer 512 on the surface of substrate 18 at cross sectional regions 1—1', 2—2' and 6—6', leaving a nitride layer 514 on the downwardly-facing surfaces of silicon island 45 (now beam 462) at cross sections 1—1' and 2—2', and leaving a dielectric nitride layer 516 over the electrical contact 482 at the regions of cross sections 3—3' and 4—4'. The island 45 is left unprotected by mask 6 at cross section 5—5' so that the etching of the layer added during step 10 also removes dielectric layer 40 and the nitride side wall 48 from the island at cross section 5—5'. This leaves the silicon material of the island 45 exposed at cross section 5—5' for later thermal oxidation.

In step 11 of FIG. 16, selective thermal oxidation of silicon is performed on the unprotected segments of the island 45, as at cross section 5—5', to convert the exposed silicon to silicon oxide as indicated at 518. At the same time, the exposed upper surface of substrate 18 is also oxidized at that same location, as indicated at 520.

Finally, in step 12, selected portions of the step 10 dielectric layers 512, 514 and 516 are removed through the use of mask No. 7, thereby completing the beam structure 462 illustrated in FIG. 15, wherein the various island cross sections 45 combine to form the beam structure. Note that at cross section 5—5' the beam is silicon oxide and at cross section 6—6', the beam is silicon nitride in the form of side walls 500.

As previously described, the various beam structures are, when isolated mechanically from the substrate, free to move not only horizontally in an X-Y plane, but vertically in the Z-direction. Vertical motion may be controlled by, or sensed by, suitable capacitances between the beam and an overlying or an underlying structure. Such a controller/sensor is illustrated in FIG. 17, wherein a portion of a structure, such as the beam 462, for example, is illustrated in cross section at 530. At this cross-section, the beam is silicon and is covered by a layer 532 of a dielectric insulating material. This layer may, for example, consist of a top layer 40 and a side wall layer 48 of dielectric material such as that illustrated at cross section 2—2' in FIG. 16, step 12. An example of a structure to produce or to sense vertical, or Z-axis, motion at this location are electrically conductive layers 534 and 535 deposited, as by means of evaporation, on the top surface of the silicon substrate 18 and on the surfaces of the beam at section 530, covering the dielectric layer 532. Thereafter, a thick layer 536 of silicon oxide is deposited over the beam and on the substrate 18 in the region of section 530 and then a second layer 538 of electrically conductive material is deposited, as by evaporation, on top of the silicon oxide. Thereafter, the silicon oxide layer 536 is patterned, and portions are etched away to release the beam segment 530, leaving support walls on each side of the beam and leaving the conductive layer 538 spanning the beam and spaced above the conductive layer 535. By applying a potential between the conductive layers 534 and 535, or between the conductive layers 535 and 538, vertical motion of the beam can be achieved or can be detected.

Figure 18:
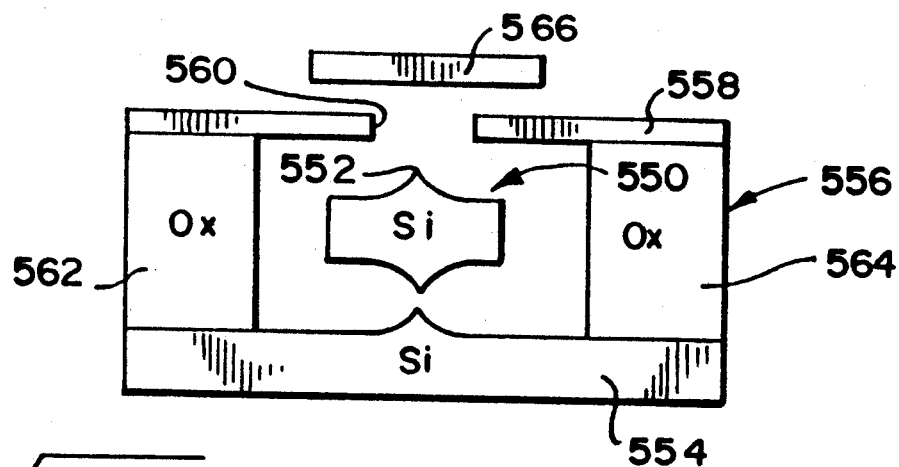
FIG. 18 is a diagrammatic illustration of a tip structure usable in a scanning electron microscope.

An application of the foregoing structures and fabrication techniques is illustrated in FIG. 18, wherein a beam structure 550 incorporating an upwardly-facing tip 552 is used in a scanning electron microscope. The beam structure 550 preferably is similar to that illustrated in FIG. 11, step 5, and is similarly fabricated. The beam 550 and its substrate silicon layer 554 is then covered with an oxide layer 556 in the manner described with respect to FIG. 17, and a conductive layer 558 is evaporated onto the top surface of the oxide layer. The conductive layer is patterned to produce an aperture 560 in the conductive layer, with its axis being coaxial with the tip 552. Thereafter the oxide layer 564 is patterned and portions are removed to release the beam 550, while leaving oxide side wall supports 562 and 564 to hold the conductive layer 558 in place. The electrically conductive beam 550 enables current to flow through aperture 560 between the submicron tip 552, and a sample material 566 located on the opposite side of the aperture from the location of the tip. The beam 550, and thus the tip 552 is movable in the manner described herein to enable the tip to scan the surface of the sample, with the current flow being measurable to determine characteristics of the sample.

Figure 19:
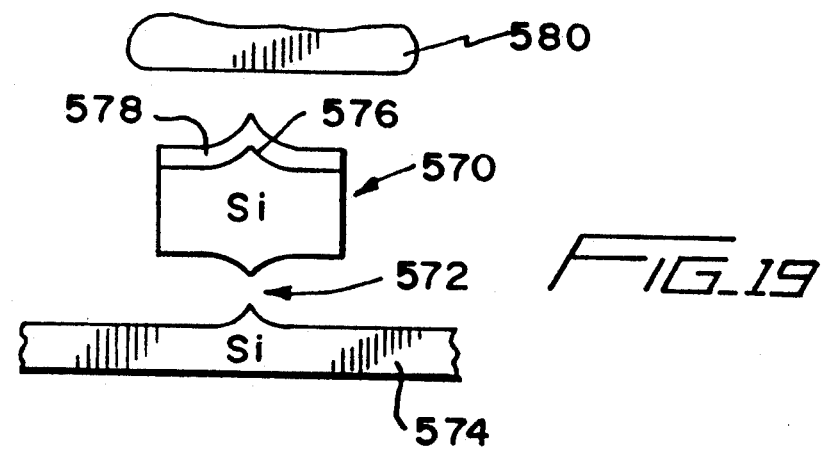
FIG. 19 is a diagrammatic illustration of a tip structure usable in an atomic force microscope.

Another application of the upwardly-facing tip structure fabricated by the technique of FIG. 11 is illustrated in FIG. 19, wherein a beam 570 includes a pair of opposed, self-aligned tunneling tips 572 formed between the beam and a substrate 574, and includes an upwardly-facing tip 576. In this embodiment, the upper surface of the beam 570 is covered by a thin electrically insulating film 578. The upper tip 576 is placed close to the surface of a sample 580, so that the device acts as an atomic force microscope, with the tunneling current indicating characteristics of the sample 580.

Figure 20:
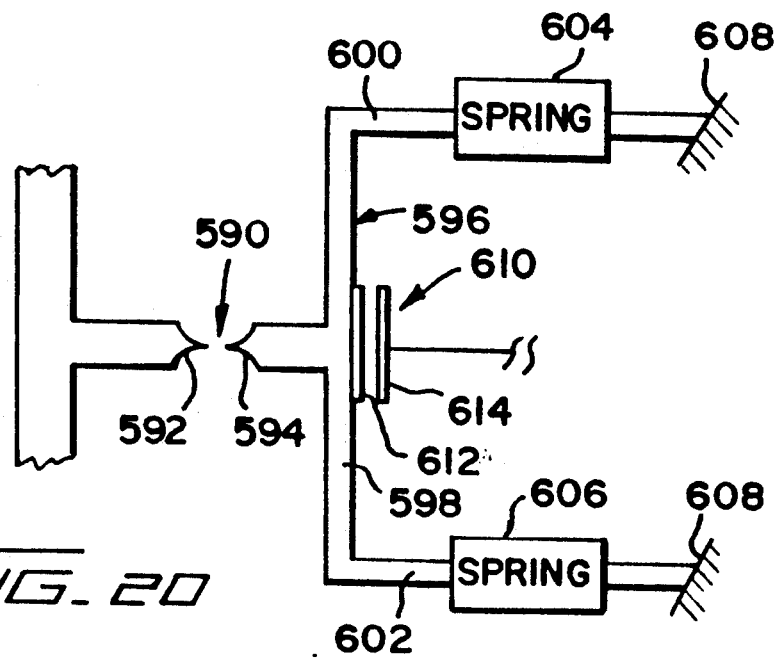
FIG. 20 illustrates the use of a horizontal tip structure as a motion sensor.

A use for lateral self-aligned, opposed tips, which may be in the form of conical or wedge-shaped tips, is illustrated in FIG. 20. A pair 590 of laterally opposed, released, self-aligned conical or wedge-like tips are fabricated in a manner such as that illustrated in FIGS. 7-9. The pair includes a first reference tip 592 and a second, relatively movable tip 594. Tip 594 is formed integrally with a support beam 596 which is illustrated as being generally U-shaped, with a base 598 and a pair of legs 600 and 602 perpendicular thereto. The support beam is connected through a pair of springs 604 and 606 located in legs 600 and 602, respectively, to a stationary mount 608 which may be the wall of a recess in a substrate, for example. Reference tip 592 may also be located on the stationary mount 608, so as to be relatively stationary with respect to tip 594 and to act as a benchmark for the movable tip. A controller, such as a capacitor 610 having one plate 612 formed on beam 596 and a second, stationary plate 614 spaced from plate 612, is provided to position the beam 596 to establish a gap between tips 592 and 594. Thereafter, relative motion between the reference tip 592 and movable tip 594 may be caused by acceleration of the reference tip.

Figure 21:
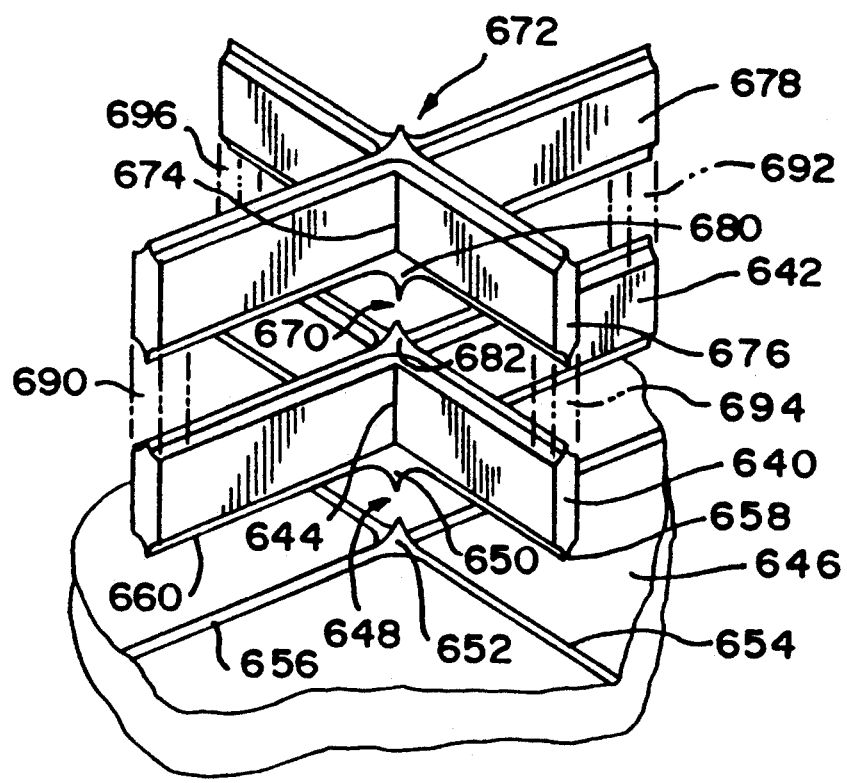
FIG. 21 is a partial perspective view of a structure formed in accordance with the processes of FIGS. 12 or 13A.

A perspective view of a stack of tips such as those illustrated in Step 5 of FIG. 12 is illustrated in FIG. 21, to which reference is now made. The tips of FIG. 21 are located at the intersections of crossed beams, such as those illustrated in FIG. 4, although in this case parallel beams stacked vertically provide plural intersections in vertical alignment. Thus, lowermost crossed beams 640 and 642 intersect at 644 to provide a crossed tip support section spaced above and supported parallel to a substrate floor 646. A first pair 648 of opposed, self-aligned upper and lower tips 650 and 652 are fabricated during the formation of beams 640 and 642, as has been discussed hereinabove, with the lower tip 652 being stationary and serving as a benchmark for locating the upper tip 650. As was the case with FIG. 4, the fabrication of the tip pair 648 leaves ridges 654 and 656 on the floor 646 parallel to and spaced below the beams 640 and 642, respectively, with the lower edges of the beams also being tapered as at 658 and 660. The tapered edges 658 and 660 are parallel to and aligned with the ridges 654 and 656, since they are formed at the same time during the separation of the beams 640 and 642 from the substrate.

As illustrated in FIG. 12, at the same time the lower tip pair 648 is fabricated, an upper tip pair 670 and a top tip 672 are formed at the intersection 674 of a pair of crossed beams 676 and 678. The upper tip pair 670 consists of vertical, opposed, self-aligned upper and lower tips 680 and 682 which are aligned with the lower tip pair 648. The uppermost, upwardly facing tip 672 is also aligned with the lower tip pair 648 and with the intermediate tip pair 670, and is fabricated as illustrated in FIG. 12.

The opposed tip pairs 648 and 670 can be axially aligned with each other or can be relatively moved in the X-Y plane, as well as being movable in the perpendicular (Z) direction by means of suitable transducers such as those illustrated in FIG. 14, for example. As discussed above, the motion of these tips with respect to each other can also be detected with a high degree of precision by the transducers, or by measuring the spacing between the tips. The latter measurement can be made by determining the tunneling currents between adjacent tips, or by measuring their capacitance or potential difference.

If desired, in fabricating the parallel beams it may be desirable to mechanically connect beams 640 and 676 and/or to mechanically connect beams 642 and 678 so that the tips in pair 670 become fixed in the X-Y plane with respect to each other. The beams remain flexible in the vertical direction between the points of mechanical connection so the tips 680 and 682 can move closer together or further apart. These tips then serve as tunneling tips to detect motion along the vertical axis. Such mechanical connections are indicated in dotted lines at 690 and 692 between beams 642 and 678 and at 694 and 696 between beams 640 and 676, and are formed by selectively removing the oxidation layer 264 (See FIG. 12, step 4) from between the beams, leaving oxide connections in place.

The topmost tip 672 functions as a probe tip, and is movable both laterally, in the X-Y plane, and vertically, to serve as anatomic force microscope, for example. The lowermost pair of tips 648 serve to locate both sets of beams in the X-Y plane with respect to the benchmark tip 652 when the beams are mechanically connected, while the spacing between the tip pairs measures vertical (Z direction) motion.

Although the present invention has been described in terms of preferred embodiments, it will be apparent that numerous modifications and variations may be made. The conical tips and wedge-like tips of the present invention can be formed in both vertical and horizontal alignments on silicon-on-insulator wafers, thin silicon membranes, or other silicon substrates, including amorphous and polysilicon films deposited on insulators, and the processes described above can easily be adapted to permit doping of the materials, using any desired type of dopant at any doping concentration. It will also be apparent that where the movable silicon beams of the present invention are formed on thin silicon membranes, the lower floor 90 (FIG. 4) can be made sufficiently thin as to be flexible to thereby obtain mobile lower tips. Further, the top island can be removed from the pair of aligned tips to leave only a single lower tip/wedge structure. It is also possible to remove the lower tip, such as the tip 12 in FIG. 4, to create an aperture through the floor 90, through which electrons can flow from the upper tip, or to use the intersecting beams of FIG. 4 to electrically move the upper tip to specified locations. It is further possible to locate elements such as tunnel diodes, field emitters, p-n diodes, or the like, on a movable tip.

The process of the present invention may also be used to create pillars as well as beams, and in addition, by oxidizing selected locations of such pillars and beams, segments of the structures can be electrically isolated from one another. Thus, the present invention is limited only by the true spirit and scope of the following claims.

What is claimed is:
1. A submicron tip structure, comprising a substrate;

support means spaced above said substrate; and a pair of self-aligned, opposed sensing tips, each tip having an end portion with at least one dimension in the nanometer size range, one of said pair of tips being integral with said support means and the other being integral with said substrate, said tips being closely spaced to define a gap therebetween.

2. The device of claim wherein said tips are generally conical, and taper inwardly to a minimum diameter in said nanometer size range.

3. The device of claim 1, wherein said support means and tips are integrated on a silicon chip forming said substrate.

4. The device of claim 1, further including capacitor means formed integrally with said support means and said substrate for sensing and controlling motion of said one of said tips.

5. The device of claim further including means supplying electrical current to at least one of said tips.

6. The device of claim 1, wherein said substrate, said support means, and said tips are single crystal silicon.

7. The device of claim 1, wherein said support means comprises a beam movable with respect to said substrate.

8. The device of claim 1, wherein said substrate includes a recess having a peripheral wall and a generally planar floor portion, and wherein said support means is mounted on, and is integral with, said peripheral wall.

9. The device of claim 8, wherein said support means comprises a cantilever beam extending into said recess parallel to said floor, and wherein said one of said pair of tips is mounted on a lower surface of said beam and the other of said pair of tips is mounted on said floor portion, said gap between said opposed tips being sufficiently small to permit current tunneling therebetween.

10. The device of claim 9, wherein said beam is sufficiently flexible to permit relative motion between said tips.

11. The device of claim 10, further including circuit means responsive to changes in tunneling current between said tips for detecting motion of said beam.

12. The device of claim 10, further including means secured between said substrate and said beam for controlling motion of said beam.

13. The device of claim 12, wherein said means for controlling motion of said beam comprises capacitor means having stationary plate means secured to said substrate and relatively movable plate means secured to said beam.

14. The device of claim 1, wherein said support means includes a pair of intersecting beam segments mounted to said substrate and being relatively movable with respect to said substrate, said one of said tips being mounted at the intersection of said pair of intersecting beam segments.

15. The device of claim 14, wherein each of said pair of intersecting beam segments is incorporated in a corresponding one of a pair of beams each having first and second ends, and wherein each end of each of said pair of beams is mounted to and integral with said substrate.

16. The device of claim 15, wherein each of said pair of beams incorporates spring means for permitting three-dimensional motion of said beam segments.

17. The device of claim 16, wherein said substrate and said beams, beam segments, tips and springs are integrally formed from single crystal silicon.

18. The device of claim 16, wherein said substrate includes a recess having a peripheral wall and a generally planar floor portion, and wherein said beams are mounted on said peripheral wall and extend into said recess, generally parallel to said floor.

19. The device of claim 18, wherein one of said pair of tips is mounted at the intersection of said pair of beam segments and wherein the other of said pair of tips is mounted on said floor, said pair of tips being opposed and aligned with each other and having a gap therebetween which is sufficiently small to permit tunneling therebetween.

20. The device of claim 19, wherein said spring means includes spring elements formed in each said beam to permit motion of said beams in a plane parallel to said floor.

21. The device of claim 20, further including transducer means mounted on each said pair of beams for controlling the motion of said beams.

22. The device of claim 20, further including transducer means on each said pair of beams for detecting the motion of said beams.

23. The device of claim 22, wherein each said transducer means includes capacitor means having at least a first plate mounted on said substrate and at least a second, relatively movable plate means mounted on its corresponding beam.

24. The device of claim 23, further including first electrical conductor means connected to at least one of said tips.

25. The device of claim 24, further including second electrical conductor means connected to said capacitor means.

26. The device of claim 25, wherein each of said pair of beams comprises single crystal silicon, and wherein each of said pair of beams further includes an electrically insulative segment.

27. The device of claim 14, wherein said pair of beam segments comprise first and second linear beams, said first beam lying along an X-axis and said second beam lying along a Y-axis, said first and second beams each incorporating spring means for providing motion along said X-axis and said Y-axis for said one of said tips.

28. The device of claim 27, wherein said spring means for each of said beams includes first and second axial springs located on opposite sides of said intersection.

29. The device of claim 14, wherein said pair of beam segments are incorporated in first and second offset beams, said first offset beam including a first, X-axis beam segment and said second offset beam including a second, Y-axis beam segment.

30. The device of claim 29, wherein said first and second offset beams are shaped to provide bending moments to allow motion of said beam segments along their respective X and Y axes, whereby said one of said pair of tips is movable with respect to the other of said pair of tips in an X-Y plane defined by said X and Y axes.

31. The device of claim 30, wherein each said offset beam includes generally U-shaped segments bendable to provide axial and lateral motion for its corresponding beam segment.

32. The device of claim 1, further including upwardly-facing tip means integrally formed on said support means in vertical alignment with said pair of opposed tips.

33. The device of claim 1, further including plural pairs of self-aligned opposed sensing tips integrally formed with said substrate and said support means.

34. The device of claim 33, wherein said support means is an elongated beam, and wherein said plural pairs of tips are spaced along said beam.

35. The device of claim 33, wherein said plural pairs of tips are vertically stacked.

36. The device of claim 35, wherein said tips are conical and have terminal ends which taper to a minimum diameter in the nanometer range.

37. The device of claim 1, wherein said tips are elongated and wedge-like and which have terminal ends which taper to a minimum cross-sectional dimension in the nanometer range.

38. The device of claim 1, further including plural tips integral with said support means, and further including electrically insulating means in said support means for electrically isolating adjacent tips.

39. The device of claim 38, where said substrate, support means, and tips are single crystal silicon.

40. The device of claim 1, further including a coating layer on at least one of said pair of tips.

41. The device of claim 1, further including a magnetic film coating on said support means for moving said support means with respect to said substrate.

42. The device of claim 1, further including a piezoelectric film coating on said support means for moving said support means with respect to said substrate.

43. The device of claim 1, wherein said support means and said substrate are relatively movable, wherein said substrate, said support means and said tips are single crystal silicon, and wherein said tips are generally conical and taper to a minimum diameter in said nanometer size range.

44. The device of claim 43, further including circuit means on said substrate connected to said tips and responsive to electrical current therebetween.

45. A submicron tip structure, comprising an electrically conductive substrate;
electrically conductive tip support means spaced above said substrate, said support tip means and said substrate being fabricated from the same material;
a pair of opposed, aligned nanometer-scale tip means formed integrally with said support means and said substrate;
scanning tip means on said support means;
means on said substrate defining an aperture in alignment with and adjacent to said scanning tip means; and
means supplying electrical current to at least said scanning tip means, the current flow through said scanning tip being responsive to characteristics of material adjacent to said aperture but on the side of the aperture opposite to the location of said tip.

46. The device of claim 45, wherein said scanning tip is an upwardly facing tip integrally formed on a top surface of said support means, and wherein said aperture is located above said upwardly-facing tip.

47. The device of claim 46 further including a thin insulating film on said tip means.

48. The device of claim 45, wherein said scanning tip is on a lower surface of said support and is downwardly-facing, and wherein said aperture is located in said substrate.

49. The device of claim 45, further including electrical insulator means integral with said support means for electrically isolating said scanning means from said substrate.

50. The device of claim 45, wherein said scanning tip means includes at least a single, upwardly facing tips aligned with said pair of tips.

51. A method for forming integrated opposed, self-aligned tips for electron device structures, comprising:
patterning a silicon substrate to define an upstanding silicon island;
masking and oxidizing said island to isolate at least a part of said silicon substrate, the oxidizing step undercutting said part of said island and oxidizing through the thickness of said island to form opposed upper and lower tips at the interface point between said island and said substrate which provides the last contact therebetween during said oxidation; and
releasing said undercut part of said island to allow relative motion between said upper and lower tips.

52. A method of claim 51, wherein the step of patterning said substrate includes defining a tip support structure and a recess in said substrate surrounding said tip support structure; and
etching said substrate prior to said masking and oxidizing steps to define said island within the recess.

53. The method of claim 52, wherein the steps of patterning and etching said substrate further include defining spring means in said tip support structure, and wherein the step of releasing said island includes releasing said support structure and spring means to produce a tip support structure that is movable in said recess.

54. The method of claim 52, wherein the step of masking said substrate includes defining upper and lower recesses in said tip support structure, whereby the step of oxidizing said substrate to isolate said island also defines and isolates plural, vertically stacked, opposed and self-aligned tip pairs.

55. The method of claim 52, wherein the step of masking said substrate includes defining at least an oxidizing gap and an oxidizing recess in said tip support structure, whereby the step of oxidizing said substrate to isolate said island defines both said upper and lower tip structures and an additional, upwardly-facing tip.

56. The method of claim 52, wherein the step of masking and oxidizing said island includes;
forming on a sidewall of said island a first dielectric stack coating surrounding a lower portion of said island;
forming on said sidewall of said island a second dielectric coating on an upper portion of said island and spaced from said first dielectric coating to define an aperture around a middle portion of said island;
etching said island through said aperture to form a first recess undercutting said upper portion of said island and etching said substrate to form a second recess below said first dielectric layer to undercut said lower portion of said island; and
oxidizing said island and said substrate in said first and second recesses to isolate said upper and lower portions of said island, said oxidizing step forming a first pair of upper and lower opposed tips between said upper and lower isolated island portions and forming a second pair of upper and lower opposed tips between said lower isolated island portion and said substrate.

57. The method of claim 56, wherein the step of releasing includes removing at least a portion of said oxidation from said first and second recesses.

58. The method of claim 52, further including removing said upper tip of said first pair of opposed tips, whereby said lower tip of said first pair of tips is exposed.

59. The method of claim 52, wherein the step of masking and oxidizing said island includes:
forming a dielectric stack on a top surface of said island, said stack including an oxide layer adjacent said top surface;
forming a dielectric layer on sidewalls of said island, said dielectric layer partially overlapping said oxide layer of said stack;
etching said substrate to form a recess beneath said layer partially undercutting said island;
oxidizing said island and said substrate around said dielectric layer to thereby oxidize the upper surface of said island through said oxide layer of said stack to form a tip on said top surface, and to thereby oxidize said island through said recess to isolate said island from said substrate.

60. The method of claim 59, wherein the step of releasing includes at least partially removing said oxide from said recess to separate said island from said substrate, and further includes removing said oxide from said top surface of said island to thereby remove said stack and to expose said tip on said top surface of said island.

61. The method of claim 52, wherein the step of masking and oxidizing said island includes:
forming on a top surface of said island a dielectric stack including an oxide layer adjacent said top surface;
forming on a sidewall of said island a first dielectric coating surrounding a lower portion of said island;
forming on said sidewall of said island a second dielectric coating on an upper portion of said island and partially overlapping said oxide layer, said first and second coatings being spaced to define an aperture around said island;
etching said silicon island through said aperture and etching said substrate beneath said second dielectric coating to form first and second recesses in said island to undercut upper and lower portions, respectively, of said island;
oxidizing said island through said layer of oxide and through said first and second recesses to form an upper tip and first and second opposed tip pairs, respectively in said island.

62. The method of claim 61, wherein the step of separating includes removing at least a part of said oxidation on said top surface of said island and in said first and second recesses to remove said stack and to separate said upper and lower portions of said island from each other and from said substrate.

63. The method of claim 52, wherein the step of masking and oxidizing said silicon island includes:
a) forming a plurality of dielectric stacks on a top surface of said island;
b) forming a first dielectric layer to cover the sidewall of said island;
c) etching said substrate below said first layer to form a recess which partially undercuts a first portion of the island;
d) oxidizing said island through said recess to form a first pair of opposed tips;
e) etching said substrate to increase the height of said island with respect to said substrate and to remove a first of said plurality of dielectric stacks; and
f) repeating steps (b) through (e) to form a plurality of stacked, opposed tip pairs.

64. The method of claim 63, further including repeating steps (b) through (e) until all of said dielectric stacks have been removed from said island, and thereafter removing oxide from said recesses to release respective island portions whereby tips of said pairs of tips are relatively movable.

65. A method for forming integrated opposed, horizontally self-aligned tips for electron device structures, comprising:
patterning a silicon substrate to define an upstanding, elongated silicon island;
masking said island to form in said silicon island a plurality of side-by-side recesses and intermediate segments on an upper surface thereof;
oxidizing said island to separate said island from said substrate and to separate adjacent island segments, the separation of said segments by oxidation producing self-aligned horizontally opposed wedge-shaped tips.

66. A submicron tip structure, comprising:
a substrate;
a plurality of axially aligned supports spaced above said substrate, said supports being isolated from said substrate and at least one support being movable with respect to a second support;
at least one pair of opposed, self-aligned tips between adjacent supports and spaced by a gap, said tips tapering inwardly to a minimum dimension in the nanometer, range.

67. The structure of claim 66, wherein said at least one support is movable axially with respect to said second support.

68. The structure of claim 66, wherein said at least one support is movable in a direction perpendicular to the axis of said axially aligned supports.

69. The structure of claim 66, further including a plurality of pairs of axially aligned supports and plural opposed, self-aligned tips between adjacent pairs of supports.

* * * * *

UNITED STATES PATENT AND TRADEMARK OFFICE
CERTIFICATE OF CORRECTION

PATENT NO. : 5,235,187

DATED : August 10, 1993

INVENTOR(S) : ARNEY et al

It is certified that error appears in the above-identified patent and that said Letters Patent is hereby corrected as shown below:

Column 39:
    Claim 2, line 1 of the claim, after "claim" insert --1--.

Claim 5, line 1 of the claim, after "claim" insert --1--.
Column 41:
    Claim 43, line 2 of the claim, after "means" insert a comma (--,--);

line 4 of the claim, after "tips" insert --each--.

Claim 45, line 4 of the claim, after "said" (second occurrence) cancel "support tip" and substitute --tip support--.
Column 42:
    Claim 49, line 3 of the claim, after "scanning" insert --tip--.

Claim 50, line 2 of the claim, change "tips" to --tip--.
Column 43:
    Claim 58, line 1 of the claim, change "52" to --57--.

Signed and Sealed this

Fifteenth Day of March, 1994

*Attest:*

BRUCE LEHMAN

*Attesting Officer*     *Commissioner of Patents and Trademarks*